(12) United States Patent
Barton et al.

(10) Patent No.: US 11,424,767 B2
(45) Date of Patent: Aug. 23, 2022

(54) OUT-OF-BAND COMPENSATION OF ACTIVE ELECTRONIC DEVICE

(71) Applicant: The Regents of the University of Colorado, a body corporate, Denver, CO (US)

(72) Inventors: Taylor Wallis Barton, Boulder, CO (US); William Sear, Aurora, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 17/146,965

(22) Filed: Jan. 12, 2021

(65) Prior Publication Data

US 2021/0218423 A1   Jul. 15, 2021

Related U.S. Application Data

(60) Provisional application No. 62/960,874, filed on Jan. 14, 2020.

(51) Int. Cl.
*H04B 1/00* (2006.01)
*H04B 1/04* (2006.01)
*H04B 1/10* (2006.01)

(52) U.S. Cl.
CPC ......... *H04B 1/0057* (2013.01); *H04B 1/0458* (2013.01); *H04B 1/0475* (2013.01); *H04B 1/1036* (2013.01); *H04B 2001/0433* (2013.01)

(58) Field of Classification Search
CPC ...... H04B 1/04; H04B 1/0458; H04B 1/0475; H04B 1/0057; H04B 1/1036; H04B 1/38; H04B 1/40; H04B 10/40; H04B 15/00; H04B 17/13; H04B 2001/0408; H04B 2001/0425; H04B 2001/0433; H04B 2001/485; H04W 52/0209; H04W 52/0261; H04W 88/02; H03F 1/3247; H03F 2200/387; H03F 2200/451; H03F 2201/3212

See application file for complete search history.

(56) References Cited

U.S. PATENT DOCUMENTS

| | | | |
|---|---|---|---|
| 7,092,691 B2 * | 8/2006 | Bohn | H03F 1/565 455/280 |
| 8,107,901 B2 * | 1/2012 | Gailus | H03F 1/083 455/114.3 |

(Continued)

*Primary Examiner* — Quochien B Vuong

(57) ABSTRACT

Systems and methods for controlling power amplifier (PA) performance metrics such as linearity and stability based on out-of-band feedback are presented. Various embodiments provide for synthesizing negative baseband termination using a feedback network between the drain and gate bias paths of the PA, so that the intermodulation distortion (IMD) is suppressed without an increase in system complexity. Other embodiments include a feedback network topology between the drain and gate bias paths of the PA that provides stability enhancement of the PA without the need for conventional stability networks in the radio frequency (RF) path. The out-of-band feedback nature of the approach means that the continuous wave (CW) RF performance is not perturbed, enabling conventional design techniques to be used for the input and output matching networks while enhancing aspects of the PA performance.

21 Claims, 30 Drawing Sheets
(10 of 30 Drawing Sheet(s) Filed in Color)

(56) References Cited

U.S. PATENT DOCUMENTS

| | | | |
|---|---|---|---|
| 8,811,917 B2* | 8/2014 | Kim | H03F 1/3258 |
| | | | 455/114.3 |
| 8,817,859 B2* | 8/2014 | Ghannouchi | H04B 1/0475 |
| | | | 375/224 |
| 9,397,619 B2* | 7/2016 | Lozhkin | H03F 1/3258 |
| 10,608,606 B2* | 3/2020 | Lee | H04B 1/0475 |
| 10,892,786 B1* | 1/2021 | Pratt | H04B 1/04 |
| 2019/0058497 A1* | 2/2019 | Matsuura | H04B 1/0475 |

* cited by examiner

OUT-OF-BAND COMPENSATION OF ACTIVE ELECTRONIC DEVICE

CROSS-REFERENCE TO RELATED APPLICATIONS

This application claims priority to U.S. Provisional Patent Application No. 62/960,874, filed Jan. 14, 2020, which is incorporated by reference herein in its entirety.

STATEMENT REGARDING FEDERALLY SPONSORED RESEARCH

This invention was made with government support under grant number 1846507 awarded by the National Science Foundation. The government has certain rights in the invention.

TECHNICAL FIELD

Various embodiments of the present technology generally relate to power amplifiers. More specifically, some embodiments of the present technology relate to electrical device stabilization, nonlinear distortion reduction, and/or linearization through out-of-band feedback techniques.

BACKGROUND

Radio frequency (RF) power amplifiers (PAs) are typically used to amplify signals centered at some RF operating frequency and modulated by a signal containing information encoded in, for example, amplitude and/or phase. The modulating signal itself has some bandwidth associated with it, or in other words contains frequency content in the range of frequencies termed baseband frequencies. When the RF carrier signal is multiplied by the modulating signal, the resulting signal has some instantaneous bandwidth centered at the RF carrier that is in proportion to the maximum frequency of the modulating signal. Conventional PAs exhibit a well-known tradeoff between ability to operate over some instantaneous bandwidth and other key performance metrics including efficiency and linearity.

In applications where a transmitter, comprising an RF PA with additional circuitry such as for digital signal processing, upconversion, and filtering, operates on a signal with amplitude variation, it is necessary for the transmitter to linearly replicate the amplitude modulation in its output signal. Example applications where linearity is critical include those within commercial and defense radio communications systems, such as in cellular communications systems. Next-generation New Radio (5G NR) applications are a particularly relevant application in which linearity will be critical over wide instantaneous bandwidths, due to the limited ability to correct nonlinearities on an element-by-element basis in multiple-input/multiple-output (MIMO) systems.

Typically, the RF PA is a major limitation on transmitter linearity performance, due to the need to operate the PA in a large-signal mode. At the same time, it is generally necessary for the PA to operate with maximal energy efficiency to reduce power consumption and heat dissipation along with other operational considerations. The standard approach to address the simultaneous need for linearity and efficiency is to operate the PA at a power level close to, but less than, the power at which compression occurs and to use digital pre-distortion (DPD) to correct nonlinearities. This approach is increasingly challenging as the PA output power level nears compression. Likewise, DPD becomes a far less attractive solution for high instantaneous bandwidths due to the challenges of bandwidth scaling in the digital domain. Analog linearization techniques are useful in applications without access to digital baseband signals, such as in repeaters, or when system complexity makes sampling of individual PA outputs challenging, such as in phased array or MIMO systems. On the other hand, conventional analog linearization techniques such as feedforward correction struggle to operate at high efficiencies. Therefore, there is interest in developing an analog linearization technique that is able to scale with increasing carrier frequencies and fractional bandwidth while maintaining high efficiency, and that does not increase the associated operating complexity of the power amplifier.

Power amplifier stability is a driving factor in transmitter performance, due to the mandatory requirement to avoid oscillations in operation. Conventional methods to ensure stability include the use of passive, frequency-selective networks which reduce the gain in and/or out of band to eliminate oscillation conditions. While the out-of-band gain reduction in theory does not incur a performance penalty, the stability network will inevitably degrade the in-band performance due to its insertion loss.

As such, there are a number of challenges and inefficiencies created in traditional stabilization and linearization techniques for RF PA systems. For example, traditional methods are unable to preserve signal linearity without the use of DPD or other linearization techniques. Similarly, traditional techniques are unable to preserve system stability without degradation of other performance metrics. It is with respect to these and other problems that embodiments of the present invention have been made.

SUMMARY

Systems and methods are described for feedback systems for an electrical device to control various performance metrics of the electrical device. The feedback system may exist as an out-of-band compensation path which modifies an input of an electrical device based on information obtained from the output of the electrical device. In some embodiments, a system has an active electronic device, such as a radio frequency power amplifier (RF PA) operating at an in-band frequency, and that is configured to receive an input signal and transmit an output signal. The system further incorporates an out-of-band feedback path, operating at an out-of-band frequency, embedded between the output and the input of the active electronic device. In some embodiments, the out-of-band feedback path receives information about the output of the active electronic device and then uses this information to modify one or more characteristics of the input of the active electronic device. In some circumstances, the out-of-band feedback path includes various circuit elements designed to implement one or more transfer functions. In certain circumstances, the various circuit elements may be configured to synthesize a transfer function. In some embodiments, the out-of-band feedback path circuitry elements include one or more attenuators, signal filters, signal diplexers, inductors, or capacitors.

The out-of-band feedback path may further include active circuitry which may synthesize a transfer function used to control one or more performance metrics of the active electronic device. In other embodiments, the signal filter of the out-of-band feedback path may be a resonant filter that is configured to block any signals that have a frequency above a baseband frequency. In still further embodiments, the out-of-band feedback path may be modified to include non-linear circuitry which may read one or more additional performance metrics of the active electronic devices, such as power output. The non-linear circuitry may then modify the operation of the out-of-band feedback path in accordance with the one or more additional performance metrics. In certain circumstances, the out-of-band feedback path may include a digital controller or a hybrid digital-analog controller. Furthermore, it should be appreciated that the out-of-band feedback path and the in-band active electronic device may operate at different frequencies or different frequency ranges. The system may further include various computing systems to augment any of the aforementioned system elements.

In some embodiments, a method to facilitate electrical device stabilization is presented. In certain embodiments, the method includes diplexing an output signal of an active electronic device. The active electronic device may operate at an in-band frequency. The diplexed output signal of the active electronic device is then attenuated at an out-of-band frequency. It should be appreciated that the out-of-band frequency and the in-band frequency can be different frequencies or different frequency ranges. Additionally, the attenuation may be designed as frequency-selective (in other words, as a filter or particular transfer function) in order to produce the appropriate attenuation and phase shift over a range of out-of-band frequencies. After the attenuated output signal has been filtered, the filtered output signal is diplexed with an input signal of the active electronic device in order to combine the filtered output signal and the input signal of the active electronic device.

In some embodiments, attenuating the diplexed output signal may utilize active circuitry to synthesize a transfer function to further alter the attenuation of the diplexed output signal. The method may further include monitoring one or more additional output metrics of the active electronic device and adjusting the attenuation or filtering of the output signal with regards to the one or more output metrics. For example, the output power of the active electronic device may be measured and the attenuation of the diplexed output signal may be adjusted accordingly to create a power dependent response. The method may further include the implementation of one or more digital control techniques or hybrid digital-analog control techniques. Additionally, various embodiments provide for a method that incorporates Nyquist analysis to determine which loop gain frequencies of the diplexed output signal are unstable and then applying an appropriate compensation function at the unstable loop gain frequencies.

The method centers on controlling the amplitude and phase of the feedback path connecting the drain and gate biases. The method simultaneously suppresses both upper and lower IMD3 tones over a wide range of tone spacing. Suppression at the P3 dB point is targeted due to the challenges of linearization at this power level through other means such as sweet-spot design. The capability to suppress IMD3 in gain compression prevents the need to operate the PA in backoff, thus allowing for higher-power and higher-efficiency operation.

In still further embodiments, a system including a PA stabilized with a low-frequency feedback network that replaces the conventional stability network is presented. A stabilization system is applied as a network between the gate and drain bias lines of a PA and no lossy elements are introduced into the RF signal path. A proof-of-concept PA operates at 900 MHz with a small-signal gain of 24.65 dB, close to the approximately 27 dB maximum available gain of the prototype device, while remaining unconditionally stable over all frequencies under small signal conditions as verified through measurements of the final amplifier. Large-signal measurements of the PA show typical class-AB performance, with 65% PAE at 39.5 dBm CW output power (P3 dB).

In yet other embodiments, a circuit for stabilizing an active electronic device that operates at an in-band frequency (or range of in-band frequencies) is presented. The circuit may include a first means for diplexing an output signal of the active electronic device. The first means for diplexing can be configured for connecting, or otherwise electrically coupling, to an output path of the active electronic device. The circuit may also include a controlling means for altering the diplexed output signal coupled to the first means for diplexing. The controlling means can be configured to implement a transfer function on the diplexed output signal received by the controlling means from the first diplexing means. The controlling means can be further configured to operate at an out-of-band frequency (or range of out-of-band frequencies) that differs from the in-band frequency (or range of frequencies). The circuit may further include a second means for diplexing the altered diplexed output signal coupled to the controlling means. The second means for diplexing can be configured for connecting, or otherwise electrically coupling, to an input path of the active electronic device.

In the circuit according to the present technology, the controlling means may include a signal filter to facilitate implementing the transfer function on the diplexed output signal received by the controlling means from the first diplexing means. In one example, the signal filter is a 7-pole pole filter. In another example, the signal filter is a 9-pole filter.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present technology will be described and explained through the use of the accompanying drawings.

Figure 1:
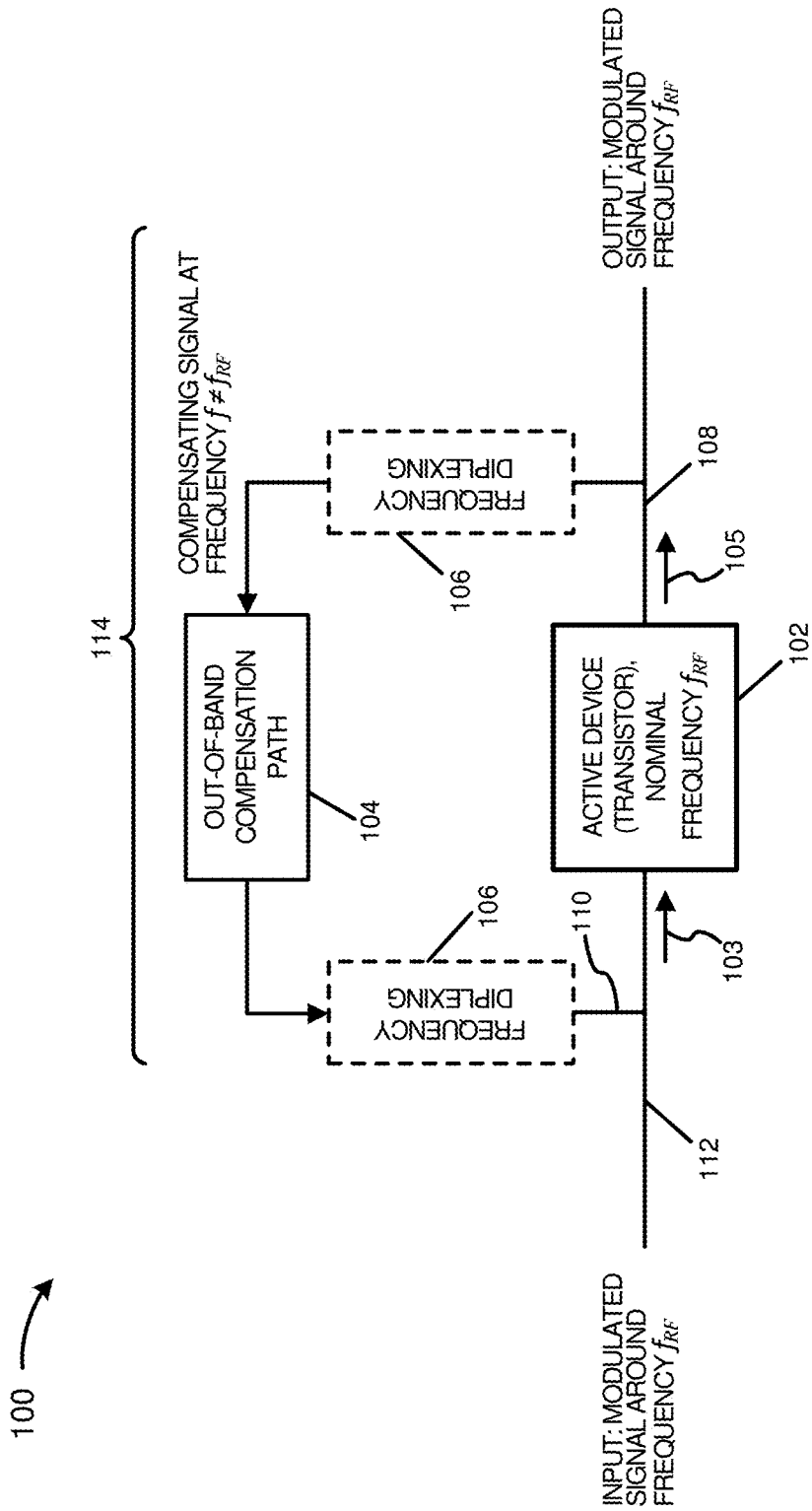
FIG. 1 illustrates a block diagram in which some embodiments of the present technology may be implemented.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present invention generally relate to out-of-band feedback systems for active electronic devices to control device performance. When analyzing the operating conditions of a power amplifier (PA) or any other active electronic device with a feedback loop, the system stability can be assessed by dividing the analysis into three regions of operation: below the operating band, where the out-of-band feedback will operate; within the operating band, where conditional stability is allowed; and above band, where unconditional stability is ensured through the output matching network design. The single-stage PA is modeled where the transistor is treated as a frequency dependent forward gain path with a local feedback path dominated by an internal feedback capacitor. The gain of this model is also dependent on the impedances presented at the source and load by the input and output matching networks. In-band and above band, the system behaves as a standard RF PA. At below band frequencies, a feedback network is introduced, to control stability, thereby treating the existing PA as a minor loop.

In other embodiments, another theoretical approach can be taken to combat instability and improve linearity in the power amplifier or some other electrical device. Traditional approaches to stability correction involve a tradeoff between efficiency and linearity. The standard approach to break this efficiency-linearity tradeoff is to operate closer to power compression and use digital pre-distortion (DPD) to correct nonlinearities. This approach is increasingly challenging as the PA nears compression. Likewise, DPD becomes a less attractive solution for high instantaneous bandwidths due to the challenges of bandwidth scaling. Analog linearization techniques, on the other hand, are useful in applications without access to digital baseband signals, such as in repeaters or when system complexity makes sampling of individual PA outputs challenging, such as in phased array or multiple-input-multiple-output (MIMO) systems. Therefore, there is interest in developing an analog linearization technique that is able to scale with increasing carrier frequencies and fractional bandwidth, and that does not increase the operating complexity of the PA.

Several analog linearization techniques for PAs have been proposed and investigated. One of the oldest techniques is the feedforward amplifier architecture, in which the PA and an error amplifier are used to generate a 180 degree out-of-phase copy of the third-order intermodulation (IM3) products that cancels the IM3 products at the output. While feedforward amplifiers exhibit exceptional linearity, they struggle to operate at high efficiencies. For example, traditional high efficiency feedforward amplifiers exhibit a 10% power amplifier efficiency (PAE) in compression. Alternatively, IM2 feedforward architectures introduce an auxiliary path to cancel the IM3 products. In this case, the common-mode IM3 response of a cascode amplifier is passed to its output, where the nonlinear transconductance response is cancelled out, thus suppressing the IM3 products. Lower-complexity alternatives include analog pre-distortion through diode structures providing a gain-expansion characteristic, a technique commonly applied to travelling wave tube amplifiers (TWTAs). Conventional single-ended amplifiers can also be made linear through selection of the amplifier's bias point to operate in a "sweet spot". IMD3 sweet spots are selected by choice of bias point and impedance terminations such that weak and strong non-linearities interact to produce a minimum. Since the underlying mechanisms are power-dependent, these sweet spots occur over a limited range of output power levels, and an efficiency-linearity compromise is apparent.

Nonzero baseband impedance in the bias line of an amplifier will induce self-modulation effects that degrade linearity. Presenting a negative intermediate frequency (IF) impedance significantly improves the intermodulation distortion (IMD) product suppression compared to a short-circuit termination. These results indicate that IMD products resulting from third-order nonlinearities (IMD3) can be effectively suppressed through analog techniques focused on controlling the impedance presented at the signal baseband.

Some embodiments provide for a linearity enhancement technique or system that realizes a negative baseband impedance without the need for an external signal source. The proposed baseband feedback approach synthesizes a negative intermediate frequency (IF) impedance by injecting the IF tones at the drain of the transistor. Whereas in previous methods, this IF tone injection has been accomplished using external generators, in this or other embodiments, a simple passive network is introduced, and the transistor gain is re-used for IF amplification. The low-frequency feedback path may, in some circumstance, be analogous to the "reflex" amplifier concept used in tube amplifiers in the early days of wireless communication. However, the approach is distinct in that the signal is not demodulated before being fed back into the PA. The feedback network can therefore be incorporated into the bias structure, for example at the end of a conventional quarter-wave line network. Thus, the baseband IMD correction minimally perturbs the RF performance of the PA and does not substantially increase its cost, size, weight or power consumption.

Various embodiments of the present invention relate generally to a power amplifier (PA) linearization approach based on synthesizing a negative impedance termination at the baseband frequency are presented. Various embodiments provide for synthesizing negative baseband termination using a feedback network between the drain and gate bias paths of the PA, so that the intermodulation distortion (IMD) is suppressed without an increase in system complexity. The design targets IMD third-order nonlinearity (IMD3) suppression at the PA's 3-dB compression point (P3 dB), enabling linear operation into compression.

Some embodiments can generate a negative IF impedance without requiring an external signal source. This is accomplished by recognizing that power amplifiers already generate an intermodulation term at the intermediate frequency (IF). To achieve a negative impedance, the IF tone can be fed back from the drain of the amplifier to the gate of the amplifier so that the tone can be amplified through the transistor. This feedback path transfer function must have the appropriate amplitude and phase shift to suppress IMD3 across a broad range of frequencies. The feedback transfer function can be defined in terms of arbitrary frequency-dependent amplitude and phase:

$$F(s) = A_F(s) e^{j\theta_F(s)}.$$

A prototype PA design was based around the packaged CG2H40010F device from Wolfspeed® which makes exact determination of the transfer functions that govern feedback difficult, and in some cases, impossible. Therefore, Nyquist stability analysis is implemented, with the loop transfer function simulated using the manufacturer's large-signal model to determine points of instability within the feedback system. To ensure minor loop stability and stability above the operating frequency of the feedback loop, the matching networks of the base PA without feedback are designed to ensure there will be no right-half-plane (RHP) poles. In practice, this means that the input matching network (IMN) and output matching network (OMN) of the PA are designed without high-quality factor, resonant networks.

The base PA design without feedback consists of the transistor (including the internal feedback loop), IMN and OMN, and bias structures. The bias structures are based on a quarter-wavelength transmission line terminated in an RF short (CRF), with a baseband termination provided by an inductor or other type of coil. The base PA's loop transfer function can then be simulated and shown in a Nyquist plot to determine areas of instability. Because there are no RHP poles in the forward path, the four encirclements of the −1 point during Nyquist analysis of the system (see, e.g., FIGS. 4A-4C) indicate an unstable system at certain frequencies.

In some embodiments, device instability can be corrected when a feedback path is introduced through coupling capacitors and a transfer function network. The transfer function network is designed to attenuate the loop gain at the frequencies where instability occurs as determined from Nyquist analysis. This attenuation moves the negative x-axis crossings in the Nyquist domain to the right of the −1 point, eliminating the encirclements which indicate instability in the system. In some embodiments, this effect is realized by implementing a transfer function network as a 30 dB attenuator with a third-order resonant low-pass filter to ensure that its roll-off occurs below the RF operating frequency. It should be appreciated that the overall transfer function of the feedback path is determined by a variety of factors including, but not limited to, the transfer function network, the coupling network of the feedback path formed by the linking capacitors and inductors, and other devices or control systems that may be implemented into the transfer function network or the coupling network. In this or other embodiments, the combined effect of the low-pass filter in the transfer function network and the low-pass nature of the linking path means that the PA behavior will be unaffected above the cutoff frequency, approximately 300 MHz.

When the feedback path is introduced to the active electronic device, in this case an RF PA, the system becomes stable with a phase margin of 33 degrees when the RF input and output are terminated in the nominal 50 ohms (Ω). Since the impedances presented at the input and output of a PA affect small-signal stability, the Nyquist stability is also evaluated for the case when the input and output are reactively terminated thus indicating a stable loop response with 24 degrees of phase margin (9 degrees smaller than the 50Ω case).

In general, unconditional stability in response to source and load variation is generally described using k-factor analysis, and the addition of the feedback path does not invalidate this analysis technique. The k-factors for the base PA and the PA with feedback can be compared over the valid frequency range of the device model. In addition to the feedback enforcing k>1 up to the operating frequency, an improvement in-band is observed for the PA with feedback, which is attributed to the loading effects of the linking capacitors. Because the terminating impedances are expected to be well-controlled over the operating frequency range, conditional stability is allowed from 300 to 1050 MHz. Above this band, the device gain combined with the losses in the input and output matching networks produce unconditional stability.

In some embodiments, a method to artificially generate ideal operating conditions in the IMD3 response is presented, thus decoupling the bias point selection and therefore the efficiency from the IMD3 response. In this method, tone spacing for the IMD3 response can be suppressed for both upper and lower IMD3 tones across tone spacings from 5 MHz to 200 MHz. Further embodiments provide for additional development of the theoretical performance of the technique, along with an analysis of stability. A primary focus is on linearizing the PA by suppressing the IMD3 at its 3 dB compression (P3 dB) point, where conventional techniques suffer.

The weak nonlinear response of a transistor (e.g., excluding clipping) can be described in terms of variations in transconductance ($g_m$), conductance ($g_d$), and output capacitance ($C_{ds}$) as a function of frequency and power. Nonlinear transconductance and conductance produce a particularly dominant effect in gallium nitride (GaN) devices. The model described herein is used because it has additional modeling of the IF response compared to manufacturer-provided models, although this may not be the intended application of the embedding model. The information available from simulation, even with this model, may not be sufficient for an accurate prediction of the IMD3 response of the device under compression conditions. Therefore, in some situations, simulation results are only used to approximate the trends in the upper and lower IMD3 tones.

The theory relating the IF impedance termination at the drain of a transistor and the resulting intermodulation product strength under two-tone excitation can be described in detail. The IMD3 tone power is modeled using a Wiener nonlinear model which uses transfer coefficients ($H_1$, $H_2$, $H_3$, . . . ) that are functions of the lower order transfer coefficients, the drain impedance, and the channel nonlinearities. Although there is not an exact correlation between two-tone IMD products and linearity metrics used in applications, such as adjacent channel power ratio (ACPR), this method is useful in system analysis and is adopted here.

When the expression for intermodulation products based on a weak nonlinear model is expanded, the term of interest for the analysis, defined here as $\xi$, is the multiplier of the total intermodulation product strength. The $\xi$ expression includes two lower-order transfer functions ($H_2$) that are functions of the impedances presented to the transistor: one a function of the IF impedance and the other a function of the second harmonic impedance.

$$\xi = H_2(\omega_2, -\omega_1)[Z_L(\omega_1)+1] + Z_L(-\omega_1)H_2(\omega_2, \omega_1)$$

$$H_2(\omega_2, -\omega_1) \propto Z_L(\omega_2-\omega_1)$$

$$H_2(\omega_2, \omega_1) \propto Z_L(\omega_2+\omega_1)$$

From the $\xi$ expression, it can be seen that to suppress IMD3 in conventional amplifier modes (Class-A, AB, B) in which the second harmonic frequencies are terminated in a short circuit, the IF baseband should also be terminated in a short circuit up to the maximum modulation frequency. Furthermore, a negative IF impedance can significantly improve the IMD3 suppression compared to a short circuit. As an RF PA begins to compress, both weak and strong nonlinearities are present, suggesting that in limited compression (where the efficiency is high and linearity is low) the introduction of a negative impedance allows the PA to operate in the high efficiency power region while maintaining sufficient linear response.

In this or other embodiments, the IF feedback approach offers a practical implementation of negative IF impedance synthesis for IMD3 suppression. In one embodiment, a 2.14-GHz proof-of-concept prototype is implemented using hybrid PA design techniques and has 14.8 dB small-signal gain and peak power amplifier efficiency of up to 60.1%. The implemented feedback structure demonstrates suppression of IMD3 tones at P3 dB for tone spacing up to 200 MHz, nearly 10% of the RF carrier frequency, relative to the nominal case without feedback. In preliminary tests with modulated signals, the feedback structure demonstrates improved adjacent channel leakage ratio (ACLR) and noise power ratio (NPR). While these embodiments include specific components and parameters of a proof-of-concept prototype, other embodiments may have different configurations.

The proposed method centers on controlling the amplitude and phase of the feedback path connecting the drain and gate biases of an active electronic device such as a radio frequency power amplifier (RF PA). This method simultaneously suppresses both upper and lower IMD3 tones over a wide range of tone spacing. Suppression at the P3 dB point is targeted due to the challenges of linearization at this power level through other means. The capability to suppress IMD3 in gain compression prevents the need to operate the PA in backoff, thus allowing for higher-power and higher-efficiency operation. IMD3 suppression is observed at P3 dB power level and over a range of power levels in measurement. This result may imply that an experimental determination of the feedback transfer function (rather than relying on a simulation model not designed for this application) may lead to further improvements. Furthermore, designing for a lower power level may be advantageous for suppression over a wider power range. The technique may in some circumstances, scale to higher carrier frequencies, where wider absolute instantaneous bandwidths pose a challenge for DPD, offering a potential path to augment DPD techniques.

Due to the large number of interrelated device parameters determining the optimum overall transfer function F(s), the parameters $G_F$ and $\theta_F$ are found through simulation or experiment with a feedback path placed between the gate and drain of the PA.

Current embodiments introduce an explicit IF feedback structure in the PA so that its stability can be thoroughly analyzed to verify that the feedback path for IMD3 suppression will not induce oscillations. However, it should be appreciated that the techniques used for IMD3 suppression can be applied in other systems for the suppression of a variety of signal types. For the purposes of explanation, the technique is disclosed with regards to PAs and RC networks but is not limited to such. In accordance with some embodiments, the PA is first stabilized following standard RF techniques, here involving a parallel RC network at the gate, to ensure unconditional stability in the conventional shorted-IF case. Loop gain analysis is then applied to the network including the baseband feedback structure. The response over a 100 kHz-3 GHz frequency range or the range up to the maximum frequency of the device is measured. Both of the ideal transfer functions for minimizing either the upper or lower IMD3 tone are assumed in turn. In each case, the RF input and output terminating impedances are swept over phase with a 0.99 magnitude reflection coefficient.

A summary of performance and comparison to related techniques in analog linearization is given in Table I. Although direct comparisons are difficult, significant improvements in IMD3 tend to correspond to architectures employing multiple active devices. It should also be appreciated that the majority of techniques address relatively narrow tone spacings or narrowband modulated signals. The relatively high efficiency of the IF feedback approach can be attributed to it not requiring insertion of any elements in the RF path. As can be seen from this comparison, the proof-of-concept IF feedback demonstration offers IMD3 suppression with only modest increase in circuit complexity, and no effective operating difference at the system level.

improved efficiency and gain in radio frequency power amplifiers; and/or 7) IMD3 suppression at a power amplifier's 3-dB compression point enabling linear operation into compression.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to active electronic devices incorporating feedback, or in other words, compensation paths to control various performance metrics of active electronic devices such as radio frequency power amplifiers. Performance metrics that may be controlled include, but are not limited to operating frequency, gain, noise figure, non-linear distortion products, and stability.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards,

TABLE I

Comparison of RF performance to Analog Distortion Reduction Techniques

| Ref. | Tech | Architecture | Amp. Elements | Freq. (GHz) | Pout(dBm) @ P3dB | PAE (%) @ P3dB | Two-Tone @ P3dB ||| 
|---|---|---|---|---|---|---|---|---|---|
| | | | | | | | IMD3 (dBc) | Improvement (dB) | Spacing (MHz) |
| [7] | * | Feedforward | 2 | 8.15 | 0 | | −63.6 | 18 | 500 |
| [35] | GaN | Transistor APD | 3 | 2.4 | 38.9 | 43 | −35 | 10 | 10 |
| [36] | * | Polar Env. F.B. | 1 | 1.8 | 31 | * | −47.02 | 15.19 | 1 |
| [14] | 28 nm CMOS | Sweet Spot | 1 | 28.5 | 15 | 30 | 3.84 MHz WCDMA UI/LI: −30 dBc/−30 dBc ||| 
| [9] | 0.15 um PHEMT | IM2 Feedforward | 2 | 24 | 21 | * | −40 | 3.7 | 1 |
| [15] | GaN | Sweet Spot | 1 | 3 | 33 | 45 | −25 | * | 5 |
| [37] | GaN | Doherty | 1 | 5 | 37 | 60 | −45 | * | 2.5 |
| [10] | * | Diode Linearizer | 1 | 0.5 | 53 | * | 6 MHz OFDM UI/LI: −32 dBc/−32 dBc ||| 
| [11] | * | Diode Linearizer | 1 | 2.7 | 34.1 | 37.9 | 28.6 KhZ CDMA UI/LI: −36.7 dBc/−36.7 dBc ||| 
| [30] | GaN | IF Feedback | 1 | 0.85 | 41 | 48 | −25 | 9 | 5 |
| This work | GaN | IF Feedback | 1 | 2.14 | 42.5 | 59 | −20 | 0.5 | 1 |
| | | | | | | | −9 | 7.8 | 10 |
| | | | | | | | −21 | 3.4 | 100 |
| | | | | | | | 3.84 MHz WCDMA UI/LI: −22.96 dBc/−22.36 dBc |||

Various embodiments of the present technology provide for a wide range of technical effects, advantages, and/or improvements to computing systems and components. For example, various embodiments include one or more of the following technical effects, advantages, and/or improvements: 1) stabilization of electrical systems through out-of-band feedback; 2) integrated feedback loops for electrical devices without the use of additional power or stabilization devices; 3) synthesizing negative IF impedance to improve stability and efficiency for radio frequency power amplifiers; 4) unconditional stability in up to the RF operating band; 5) removal of lossy components in the RF signal path; 6)

flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 shows a simplified block diagram 100 according to at least one embodiment of the present technology. FIG. 1 comprises of an active device 102, such as a power amplifier or transistor, operating at some range of RF frequencies ($f_{RF}$) and an out-of-band compensation path controlling device 104 performing and operating at a different range of RF frequencies (f). The active electronic device 102 includes an input path 103 and an output path 105. The out-of-band compensation path controlling device 104 may incorporate one or more electronic devices including, without limitation, digital or analog filters, attenuators, capacitors, or computing devices to manipulate one or more performance metrics of device 104. The compensation path controlling device 104 may further implement one or more transfer functions to further control device 104 performance. In other embodiments, the compensation path controlling device 104 can incorporate active circuitry, such as a computing device, to generate transfer functions to control one or more specific device 104 performance metrics.

The frequency diplexing functions 106 (e.g., "diplexers") split an output signal 108 of the active electronic device 102 and after passing through the out-of-band compensation path controlling device 104, reintegrate the split output signal 110 into the input signal 112 of the active electronic device 102. The frequency diplexing functions 106 can be performed, or otherwise implemented, either as component device(s) in a separate block, or blocks, as shown in dashed lines in FIG. 1, or the function(s) can be incorporated into the out-of-band compensation path controlling device 104. Device 104 and diplexing function(s) 106 may together comprise a feedback path 114, which may also be referred to herein as a feedback structure. As such, the one or more component devices of the feedback path 114 can receive, and implement a transfer function on, the split output signal 108 from device 102, and feed the resultant signal back to device 102 via input path 103. In some embodiments, the diplexed signal 110 is not demodulated before reintegration with the input signal 112 of the active electronic device 102. The feedback path 114 between the output and input of a PA incorporating the components and functions of FIG. 1 can operate at a different (e.g., lower) frequency from the nominal PA operation and appears as an open (or near-open) circuit at the RF operating frequency, thereby not perturbing the RF operation.

Figure 2:
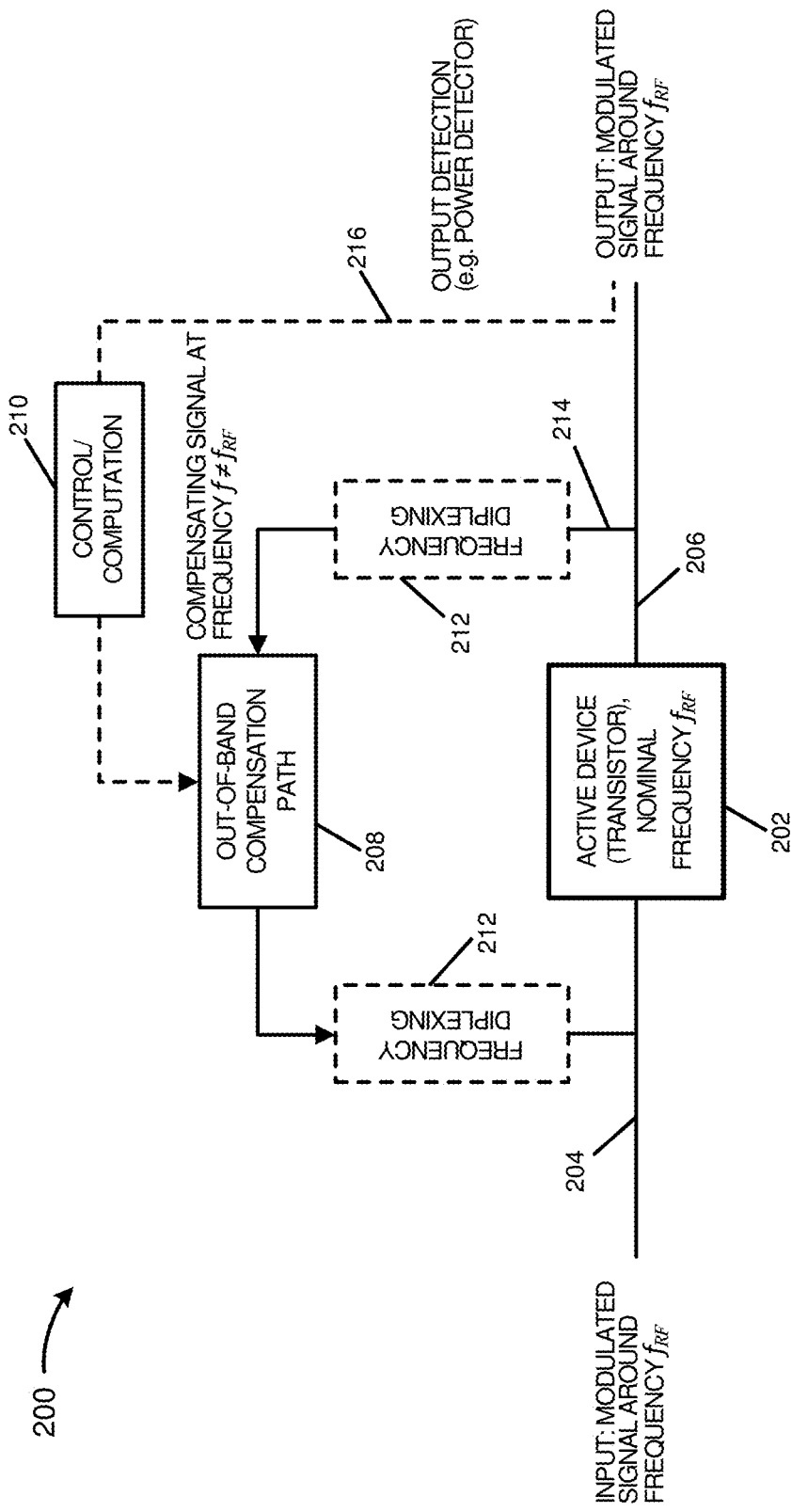
FIG. 2 illustrates a block diagram in which one or more embodiments of the present technology may implemented.

FIG. 2 shows a simplified block diagram 200 which incorporates an active electronic device 202 receiving a modulated input signal 204 at a frequency $f_{RF}$ and transmitting a modulated output signal 206 at the same frequency $f_{RF}$. The active electronic device 202 may be any device capable of receiving and transmitting electronic or analog signals including, without limitation, a power RF PA, receiver, or transmitter. Accompanying the active electronic device 202 is an out-of-band compensation path controlling device 208 which operates at a frequency f that is different than the operating frequency of the active electronic device 202, that being $f_{RF}$. The compensation path controlling device 208 may incorporate one or more electronic devices including, without limitation, attenuators, capacitors, electronic filters, signal filters, computing devices, passive electronic devices, active electronic devices, digital controllers, or hybrid digital/analog controllers or other electronic devices for signal manipulation. The out-of-band compensation path controlling device 208 may further incorporate one or more transfer functions, or alternatively, may be linked to an outside computing device 210 to generate and implement transfer functions for the out-of-band compensation path controlling device 208.

The output signal 206 of the active electronic device 202 is split by duplexing functions 212 without affecting the phase, amplitude, or any other property of the signal 206. In some embodiments, the diplexing may be accomplished by a splitter or by some other purpose-built device. The diplexed signal 214 travels through the compensation path controlling device 208 where it is annulated and filtered at an out-of-band frequency (f) that is different than the in-band frequency ($f_{RF}$) of the active electronic device 202. This annulated and filtered signal is then diplexed with the modulated input signal 204 to combine the two.

An additional control path 216 is incorporated into the system to manipulate the compensation path provided by device 208 based on the output 206 of the active device 202. The control path 216 may detect various outputs from the active electronic device 202 such as power, amplitude, phase, or some other performance metric, and manipulate the operation of the compensation path controlling device 208 accordingly. In various embodiments, the control path 216 may be implemented through active nonlinear circuitry or passive nonlinear circuitry to produce a nonlinear response based on a measured output of the active electronic device 202. The nonlinear response can be implemented by circuit design using an a priori model of the active electronic device 202 or can be actively controlled using a feedback path that monitors one or more outputs of the active electronic device 202 and actuates the compensation path 208 accordingly. It should be appreciated that the control path 208 need not be limited by the measured output metric nor by the method of control which is used to alter the compensation path 208.

Figure 3:
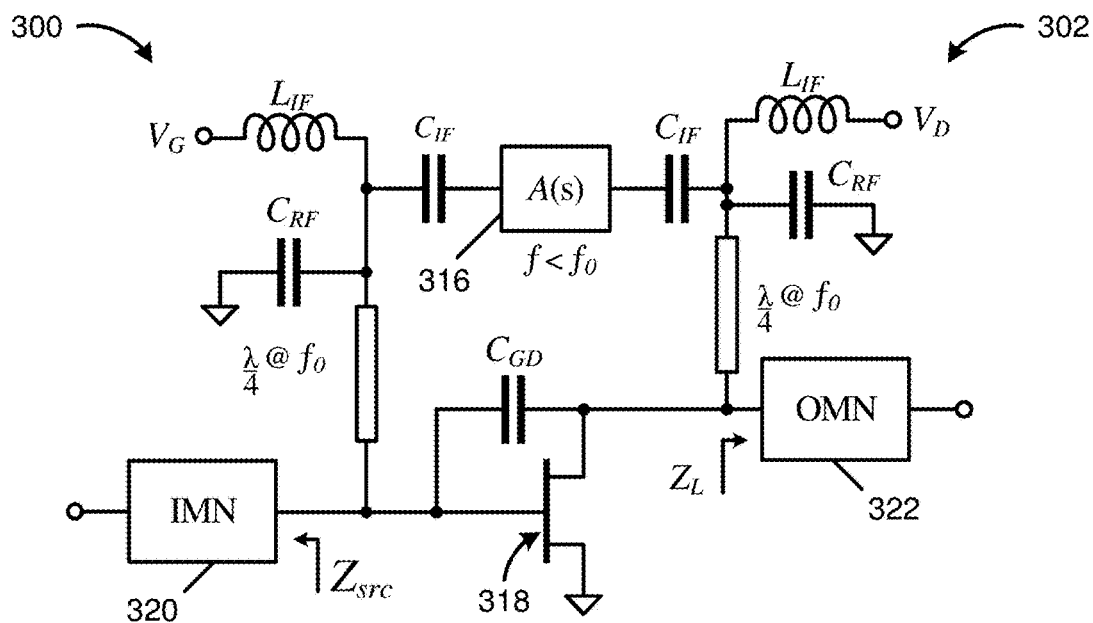
FIG. 3 is a simplified block diagram of a radio frequency power amplifier in which one or more embodiments of the present technology may be implemented.
Figure 3:
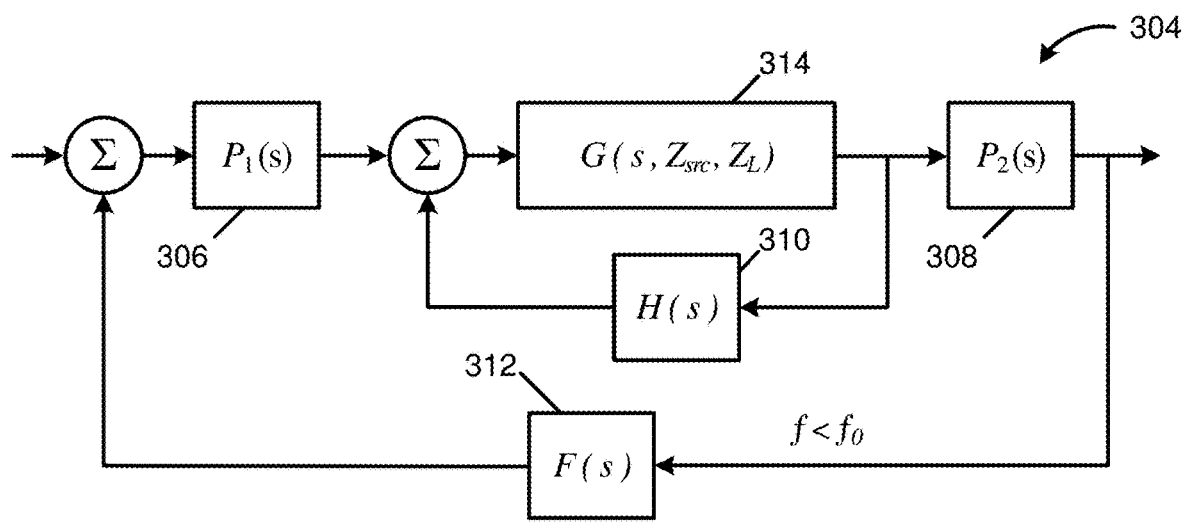

FIG. 3 presents block diagram of an out-of-band feedback stabilized PA 300. In some embodiments, the system comprises a transistor power amplifier 302 and a system response 304 including passive networks (P1(s) 306 and P2(s) 308). The system 300 further includes the internal transistor feedback network, H(s) 310. The forward path is a function of both frequency and of the impedance terminations on source and load. The feedback network transfer function (F(s) 312) depends on the coupling network 314 and filter (A(s) 316) and is designed as low-pass in nature to affect only frequencies below the RF carrier frequency. The transistor 318 may be treated as a frequency dependent forward gain path with a local feedback path dominated by capacitor $C_GD$. The gain of this "plant" is also dependent on the impedances presented at the source and load by the input 320 and output 322 matching networks. In-band and above band (e.g., for $f<f_0$), the system behaves as a standard RF PA. In further embodiments, at frequencies below $f_0$, a feedback network including transfer function (F(s) 312) is implemented to control system stability, treating the existing PA as a minor loop.

Figure 4A:
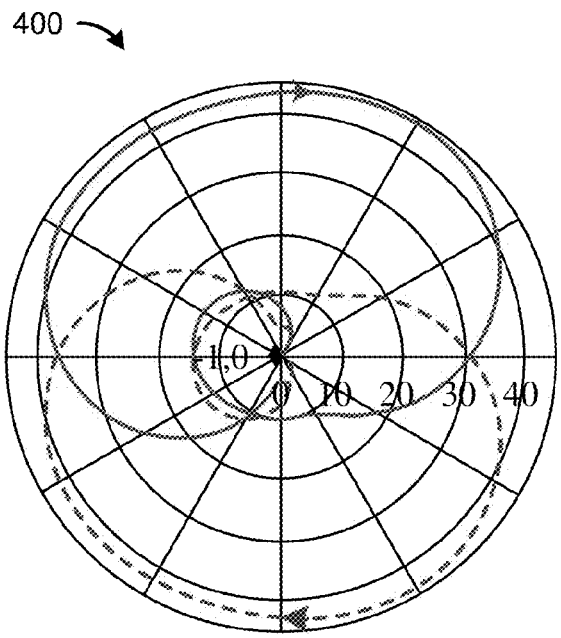
FIGS. 4A-4C are plots illustrating the Nyquist plots to determine system stability of various embodiments of the present technology.
Figure 4B:
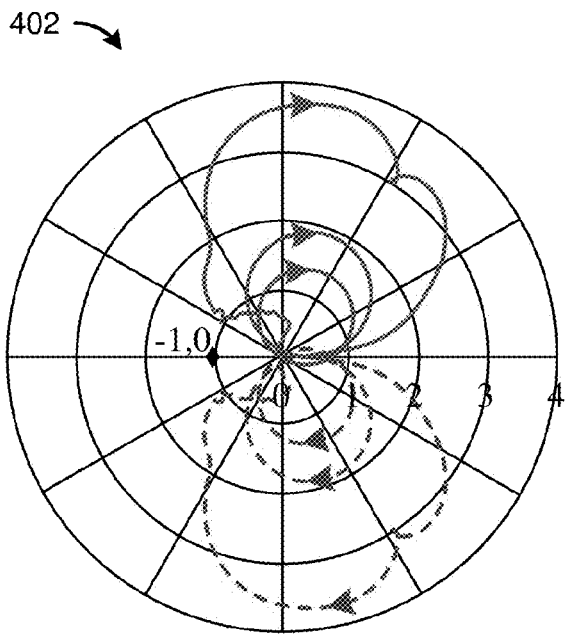
Figure 4C:
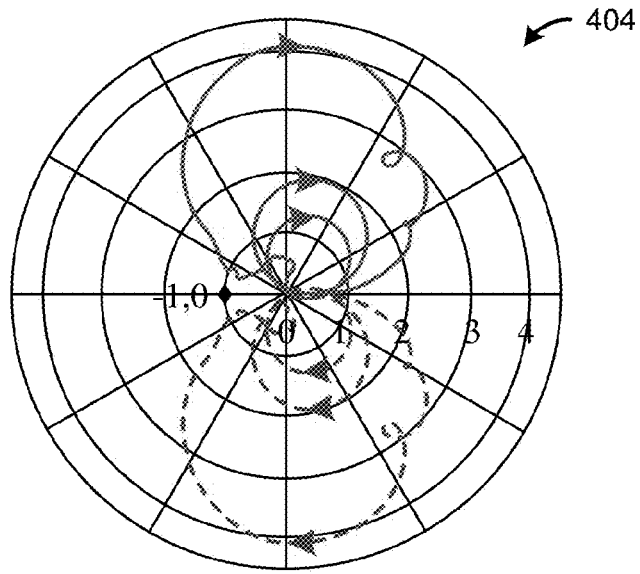

FIGS. 4A-4C shows the simulated Nyquist plots of systems that include various embodiments of the present invention. The Nyquist diagrams are based on a large-signal model and simulated under small signal excitation. FIG. 4A shows a Nyquist plot 400 for a PA that does not incorporate feedback and is terminated in the nominal 50Ω source and load. Since the Nyquist plot 400 shows the (−1,0) point to be encircled, the system is inherently unstable. FIG. 4B shows a Nyquist plot 402 for a PA with out-of-band feedback according to one or more embodiments of the present invention. Since the Nyquist plot 402 shows the (−1,0) point to not be encircled, the system is stable under the measured operating conditions. FIG. 4C shows a Nyquist plot 404 for a PA with out-of-band feedback and with the RF input and outputs according to one or more embodiments of the present invention and further demonstrates a stable system with the (−1,0) point not encircled.

Figure 5:
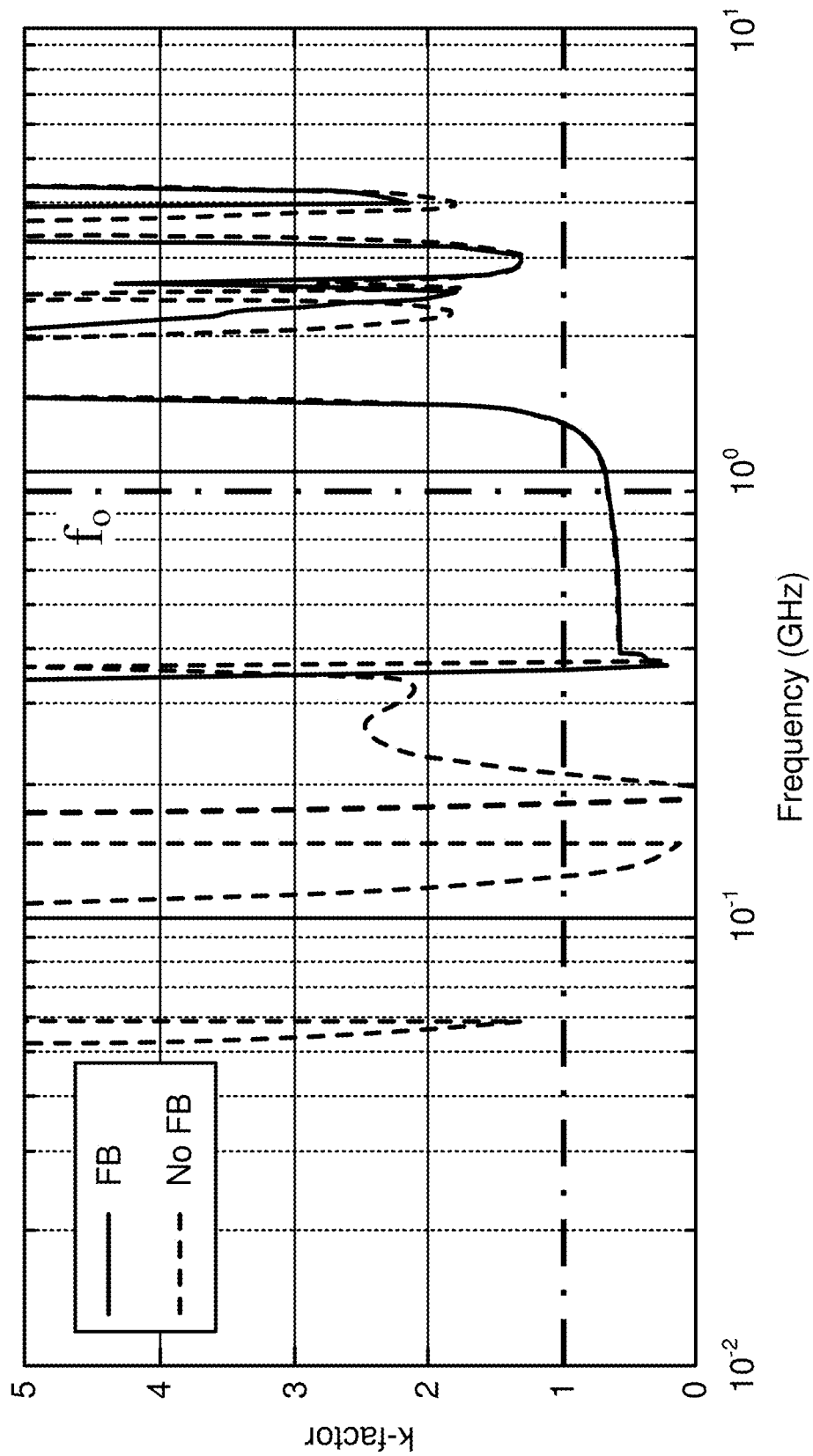
FIG. 5 is a plot illustrating the measured k-factors for various embodiments of the present invention.

FIG. 5 shows simulated the k-factors for the base PA and the PA with out-of-band feedback (FB). Unconditional stability in response to source and load variation can be described through the use of k-factors. Out-of-band feedback is shown enforcing k>1 up to the operating frequency, and an improvement in-band is observed for the PA with feedback. Since the terminating impedances are expected to be well-controlled over the operating frequency range, conditional stability is allowed from 300 MHz to 1050 MHz. Above this band, the device gain combined with the losses in the input and output matching networks produce unconditional stability.

Figure 6A:
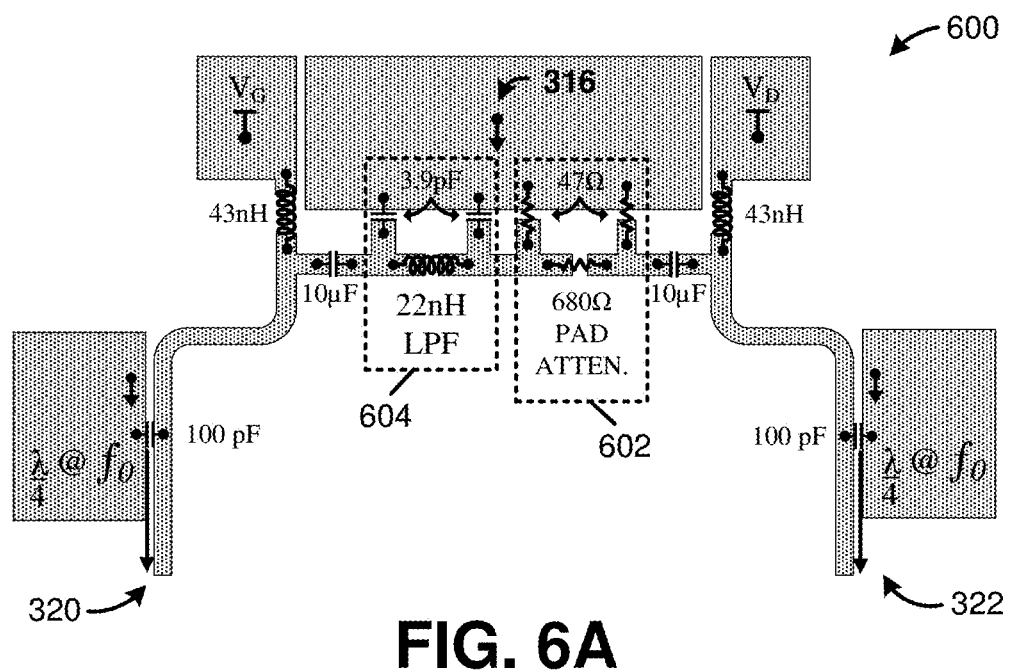
FIG. 6A is a block diagram illustrating an out-of-band feedback loop architecture in accordance with one or more embodiment of the present technology.
Figure 6B:
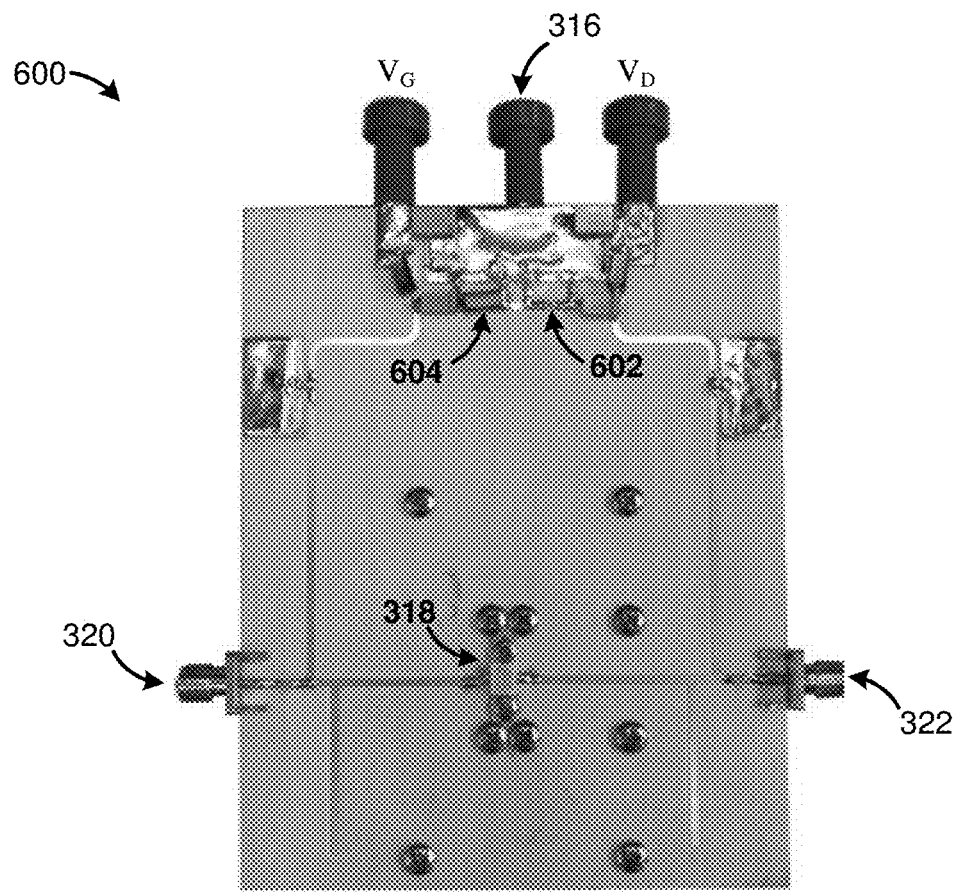
FIG. 6B is a photograph of a prototype design implementing one or more embodiments of the present technology.

FIG. 6A is a block diagram describing the structure of an out-of-band feedback system 600 according to one or more embodiments of the present technology, while FIG. 6B is a photograph of a prototype implementing system 600. Referring also to FIG. 3, the prototype system 600 as shown in FIG. 6B is a 900 MHz PA based on the CG2H40010F device from Wolfspeed® and is implemented to demonstrate the feasibility of the out-of-band feedback stabilization technique. The PA is biased in class AB with a 100 mA quiescent current. Single stub matching networks and 100 pF direct current (dc) blocking capacitors on both the gate and drain of the transistor realize the $Z_L=20.37+j19.75\Omega$ and $Z_{src}=49.68+j1.25\Omega$ target impedances (as shown in FIG. 3). The matching network topology, seen in FIG. 6A, is selected to ensure that no RHP poles exist within the base PA. In some instances, the size of this amplifier could be reduced through the use of lumped element matching networks, but the use of lumped elements would prevent decoupling the out-of-band feedback structure and RF structure from each other.

In some embodiments, the feedback structure that stabilizes the PA at frequencies below 900 MHz is made of up of a 30 dB attenuator 602 and a third order resonant low-pass filter (LPF) 604. In some applications, the attenuator 602 is implemented using a π-pad resistive structure while the LPF 604 is implemented shunt-element first with a resonance at 511 MHz. The drain and gate high-pass coupling networks formed by capacitor $C_{IF}$ and inductor LiF (shown in FIG. 3) are also a design concern and have a corner frequency of 470 Hz in system 600. The corner frequency of these coupling networks is designed to be as low as possible such that the feedback network controls stability as close to dc as possible while ensuring that the gate and drain are dc blocked to each other. A schematic diagram of the feedback structure and a photograph of the final amplifier as fabricated on 30 mil Rogers R04350B substrate are shown in FIGS. 6A and 6B. In some situations, the PA may not be tuned for RF performance.

Figure 7A:
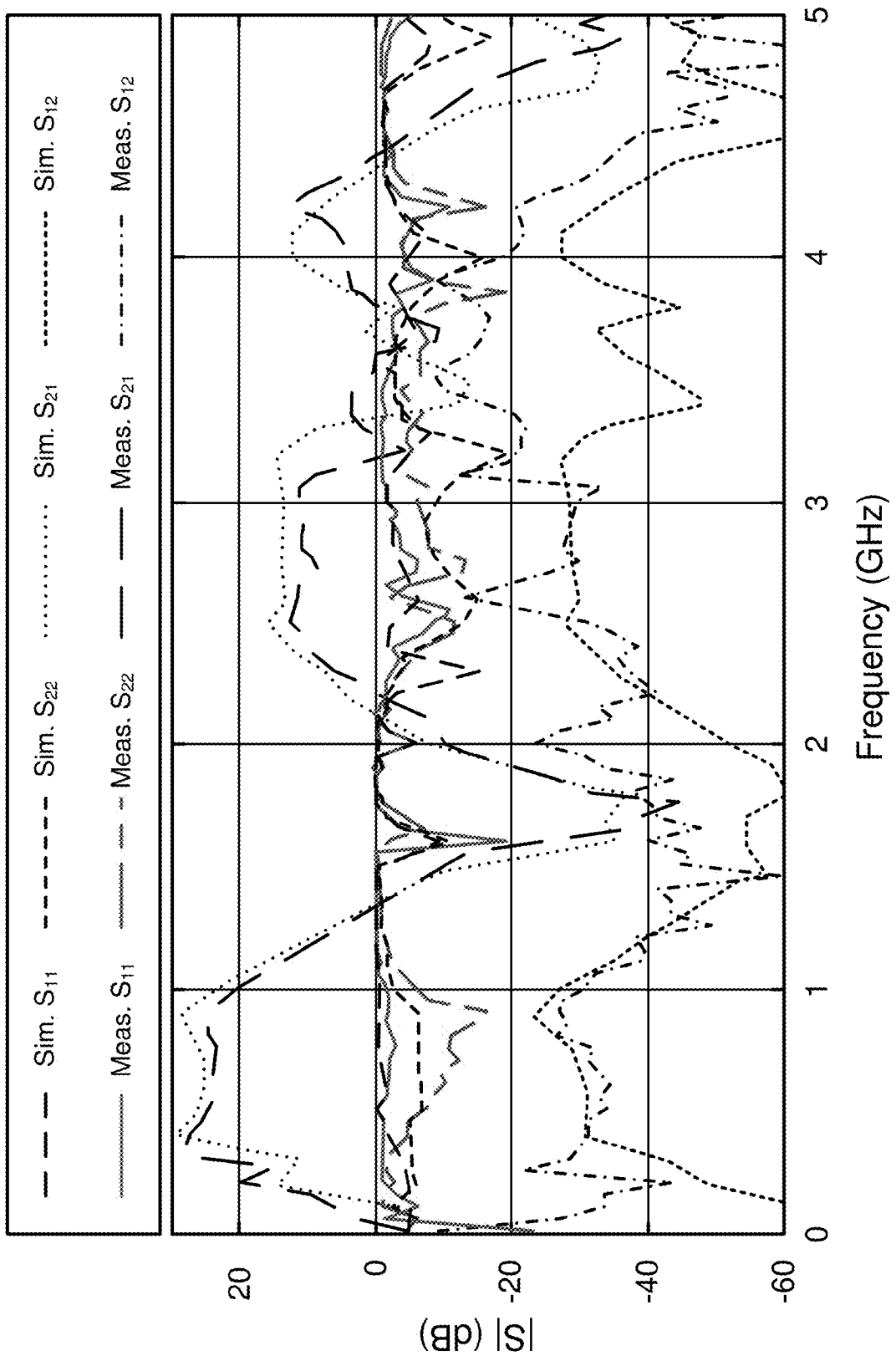
FIGS. 7A and 7B are plots illustrating the S-parameters and k-factors of various embodiments of the present technology.
Figure 7B:
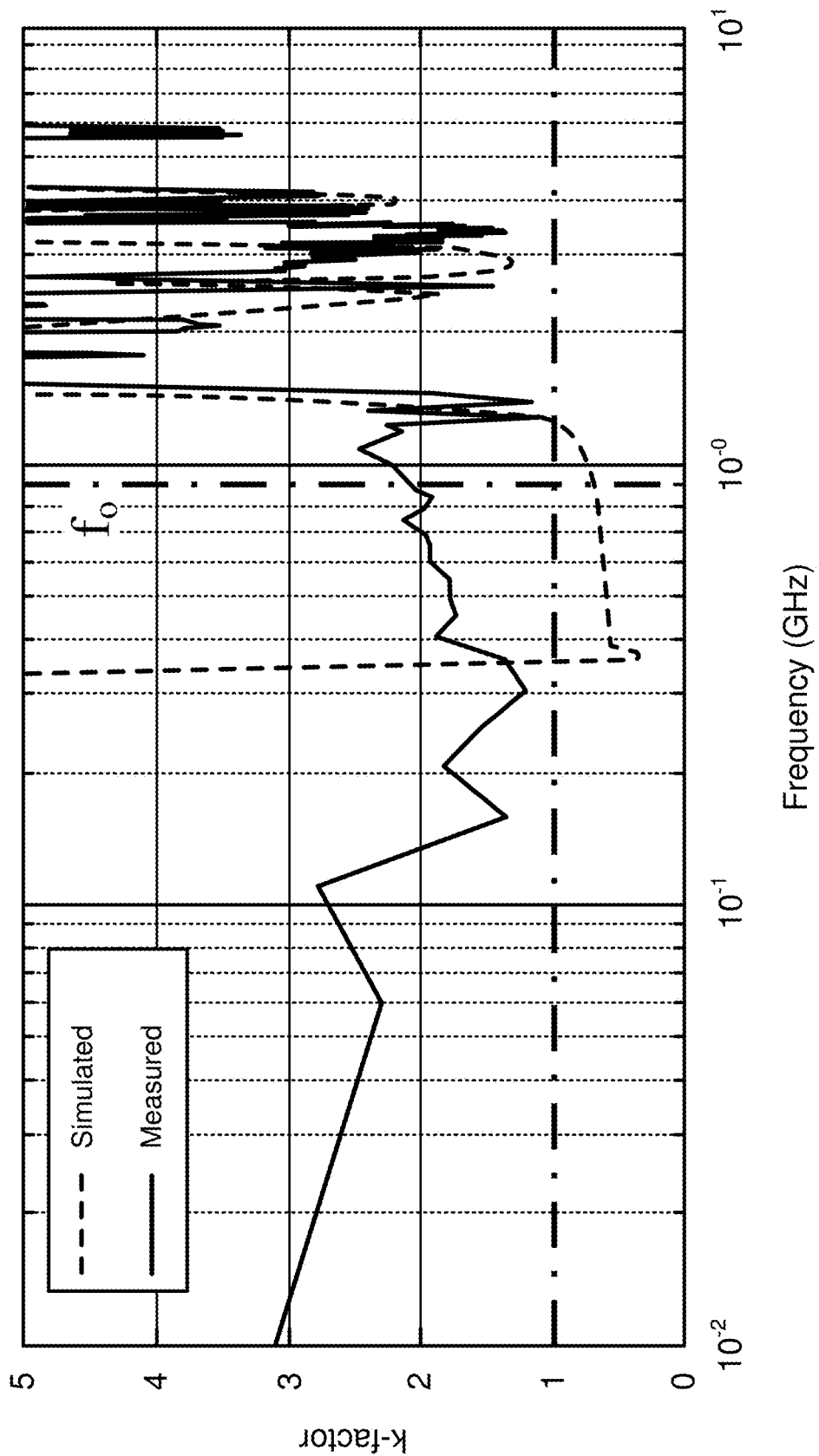

FIGS. 7A and 7B are plots demonstrating the measured and simulated S-parameter response of the PA as well as the calculated k-factors based on the measurements and the simulation. The S-parameters of the prototype PA with feedback are measured to find the response. It should be appreciated that note that S-parameters $S_{21}$ and $S_{11}$ behave similarly in simulation and measurements while S-parameter $S_{22}$ deviates significantly from simulation in-band and S-parameter $S_{12}$ is inconsistent at higher frequencies and at very low frequencies. The inconsistent S-parameter $S_{12}$ response is attributed to the need in measurement to include an attenuator at port 2, which was introduced to protect the VNA from the large forward gain of the amplifier.

A measured k-factor is computed from the S-parameters and is shown compared to a simulation in FIG. 7A. At high frequencies the k-factor of the measured amplifier is consistent with the simulation, but the in-band and below-band responses vary significantly. In-band, the PA has a measured k-factor greater than one that is most likely due to the reduced forward gain $S_{21}$ and improved output match $S_{22}$ in measurement compared to simulation. At low frequencies where the feedback network operates, a k-factor of greater than one (k>1) is found, but the measured value of k is, in some conditions, lower than was found in simulation. These lower k-factors are most likely the result of the high measured $S_{12}$ at low frequencies compared to simulation. Nonetheless, the measurements confirm unconditional stability produced by the feedback network.

Figure 8:
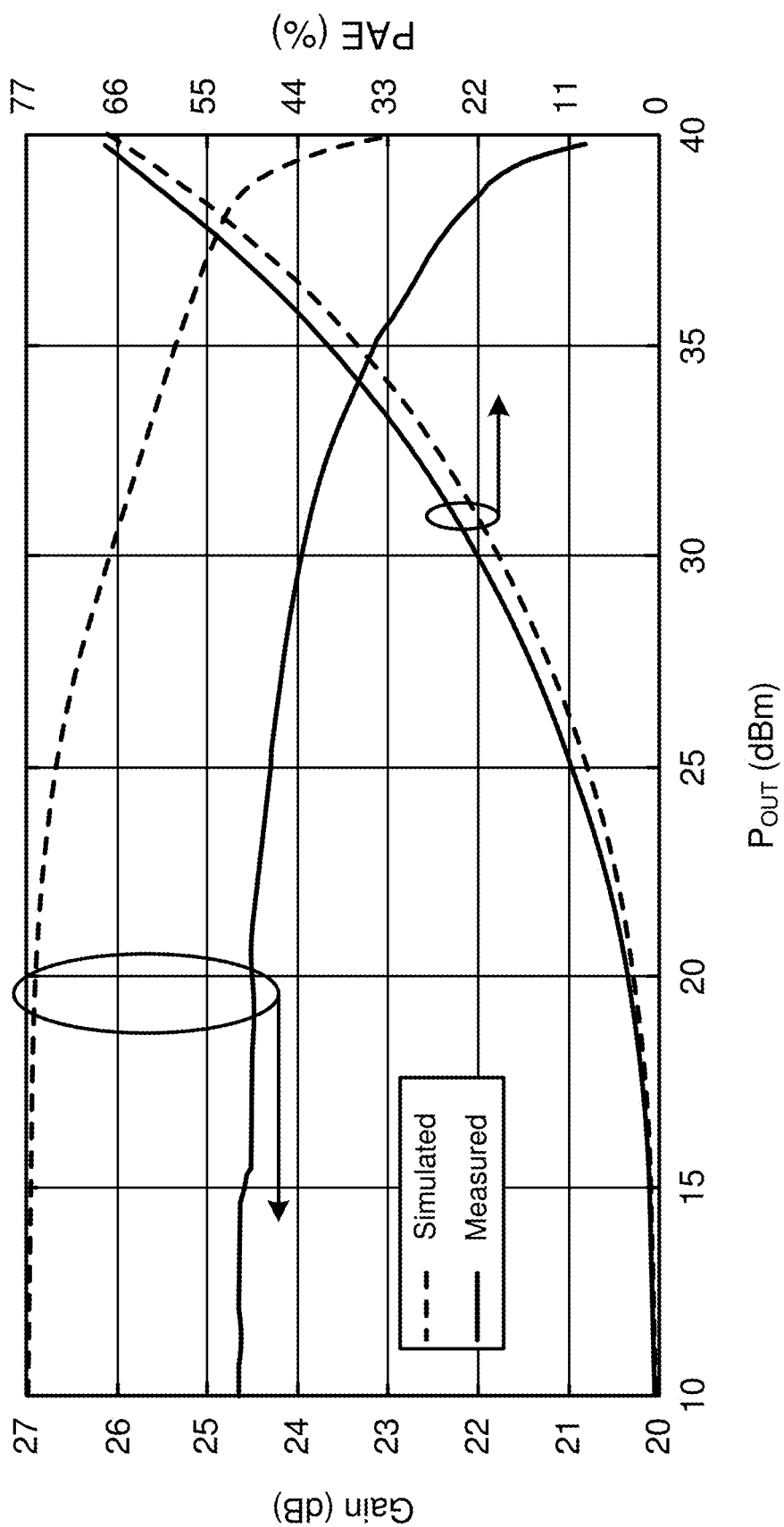
FIG. 8 is a plot comparing the measured and simulated gain according to one or more embodiments of the present technology.

With stability at dc and small signal verified, the PA's large signal response under CW excitation at 900 MHz can be determined. FIG. 8 shows a plot reporting the gain and power amplifier efficiency (PAE) of the amplifier and compares the measured results to simulation. The measured results compare favorably with simulated results for both output power and PAE in all cases. The measured gain is lower than simulation by 2.5 dB, a behavior that can be seen in S-parameter response shown in FIG. 7A.

Figure 9:
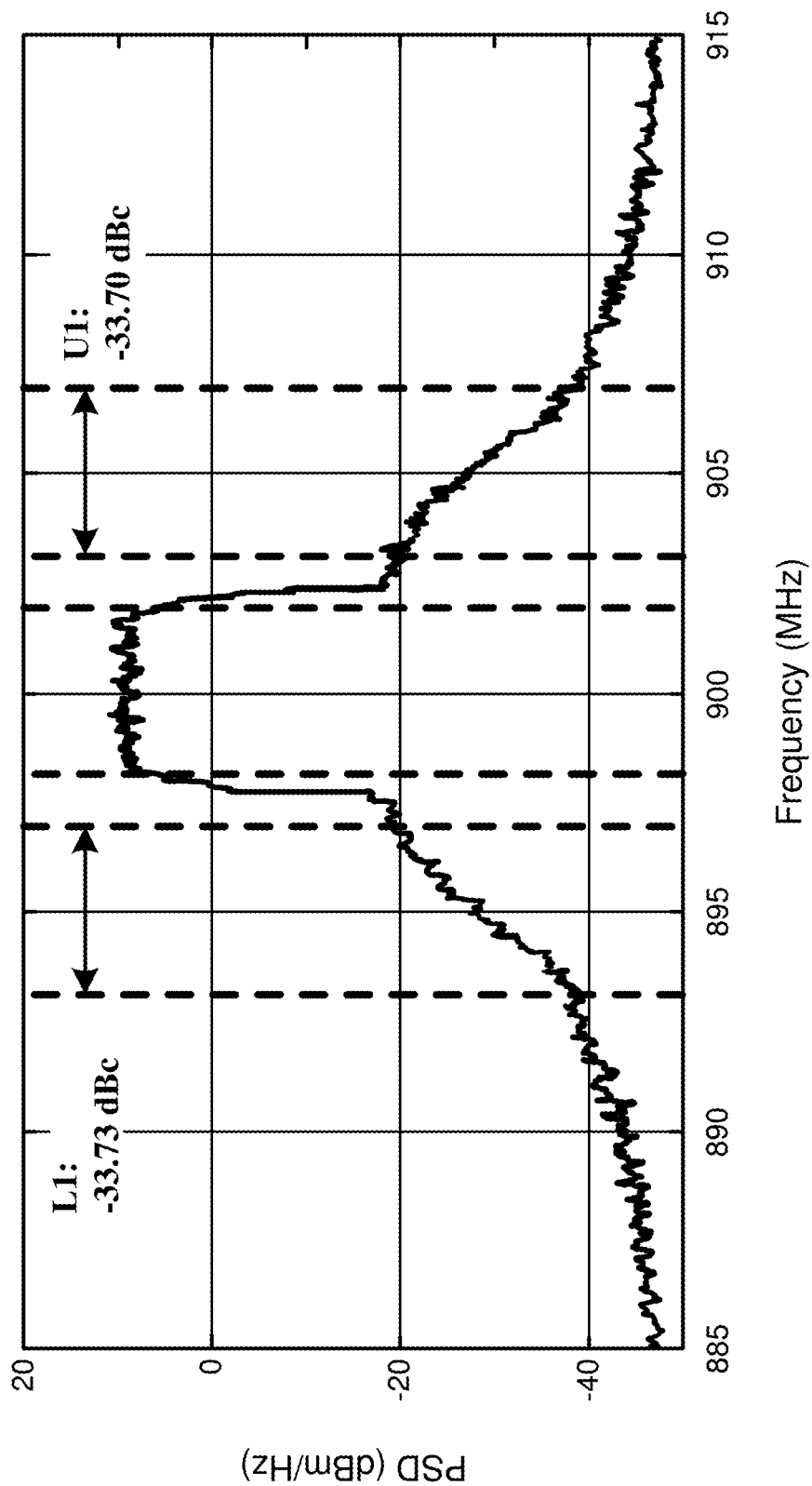
FIG. 9 is a plot illustrating various embodiments of the present technology.

When excited by a 3.84 MHz W-CDMA signal at 900 MHz with 30 dBm average output power, the PA remains stable with the output spectrum shown in FIG. 9. Under these conditions the PA realizes an ACLR U1 of −33.70 dBc and an ACLR L1 of −33.73 dBc with an average drain efficiency of 21% and a peak to average power ratio (PAPR) of 10 dB. No predistortion was applied to any of the reported measurements.

Although direct comparison to other works may be challenging due to the nature of this approach and the stability focus of this proof-of-concept work, it should be noted that the gain reported herein is substantially higher than in state-of-the-art GaN PAs at similar frequencies and power levels. For example, traditional devices experience more typical gain values for 10 W GaN PAs, with 10-13 dB gain over 1-3 GHz, and small signal gain of approximately 15 dB at 1 GHz respectively. Even accounting for device technology differences, the measured gain is 6-10 dB higher than for typical GaN PAs, while PAE is typical for the class of operation.

Figure 10:
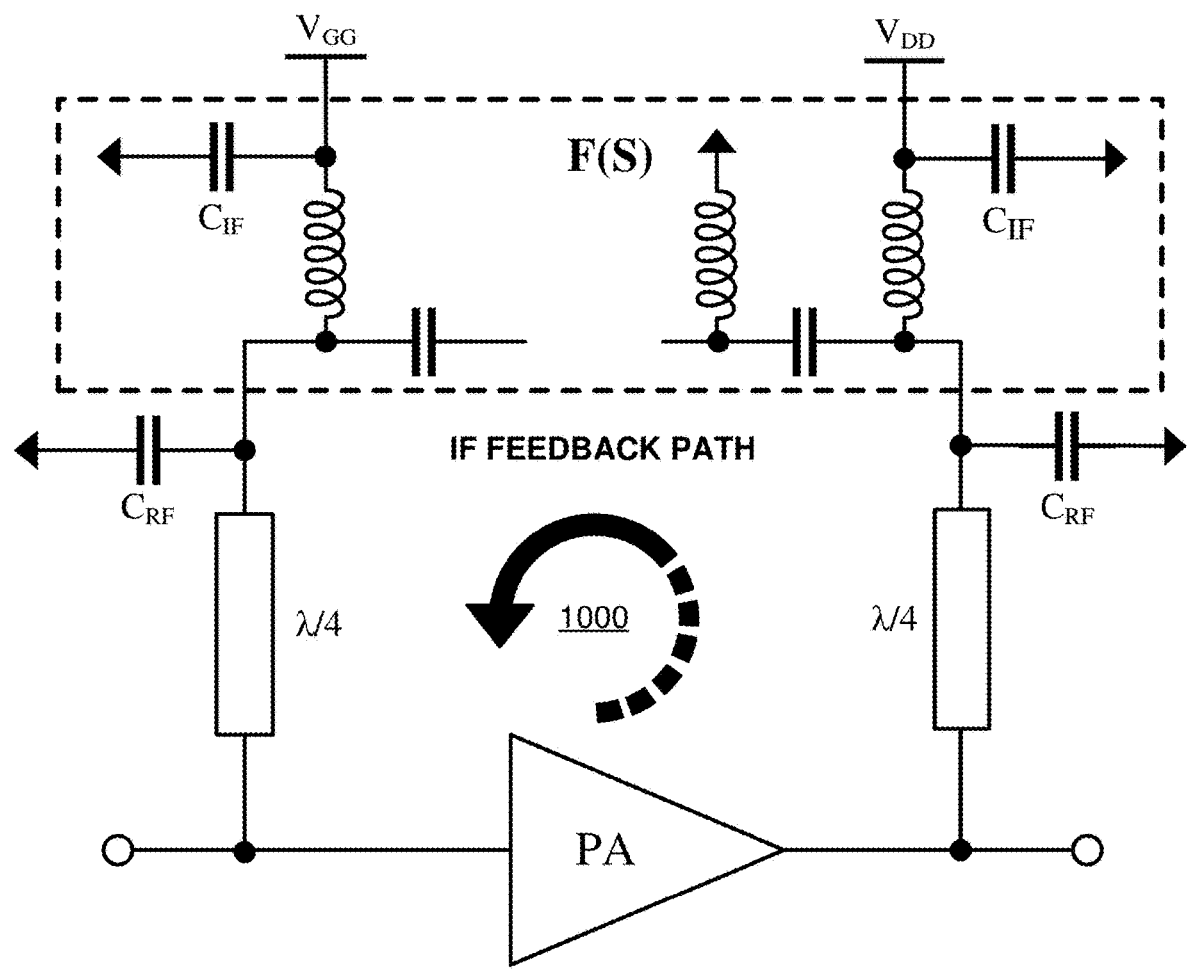
FIG. 10 illustrates block diagram in which some embodiments of the present technology may be utilized.

FIG. 10 presents a block diagram incorporating feedback path architecture consistent with one or more embodiments of the present invention. A feedback path 1000 introduced into the operating framework of an active electronic device such as a power amplifier 1000. In some embodiments, the feedback path 1000 synthesizes a negative IF impedance at the drain of a PA. By appropriately selecting the characteristics of the transfer function F(s), IMD3 tones can be suppressed at an arbitrary output power level. The feedback path 1002 may be used to control a variety of PA device 1002 performance metrics including, but not exclusively, operating frequency, power output, or gain, or other performance metrics.

Figure 11:
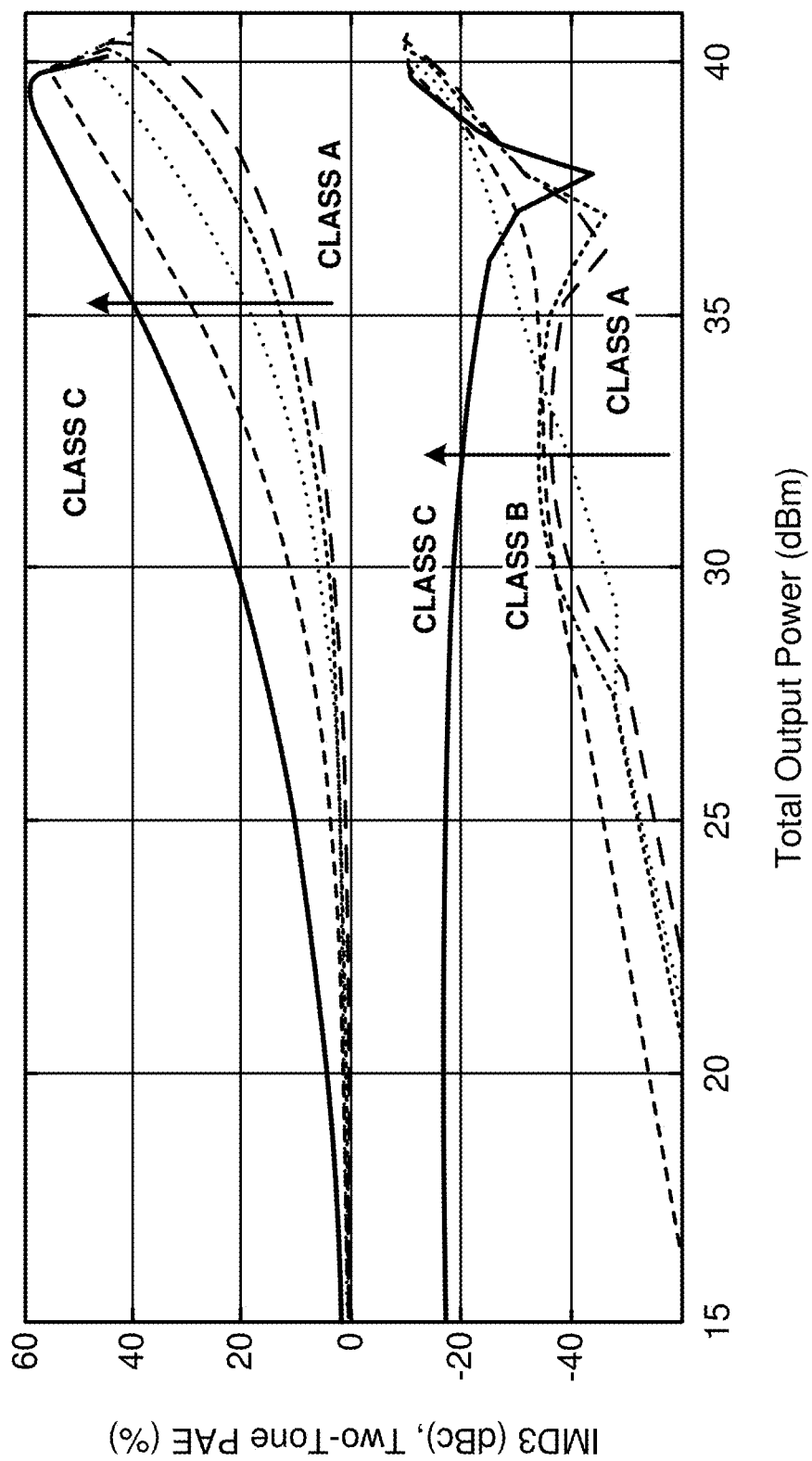
FIG. 11 is a plot illustrating the measured IMD3 and PAE.

FIG. 11 presents a plot of the measured IMD3 and PAE exhibited by the PA with the feedback path disabled and operating under two-tone excitation with 10 MHz spacing over bias conditions. This figure demonstrates the tradeoff between efficiency and linearity as well as bias-dependence for the generation of ideal operating conditions when conventional techniques are used.

Figure 12:
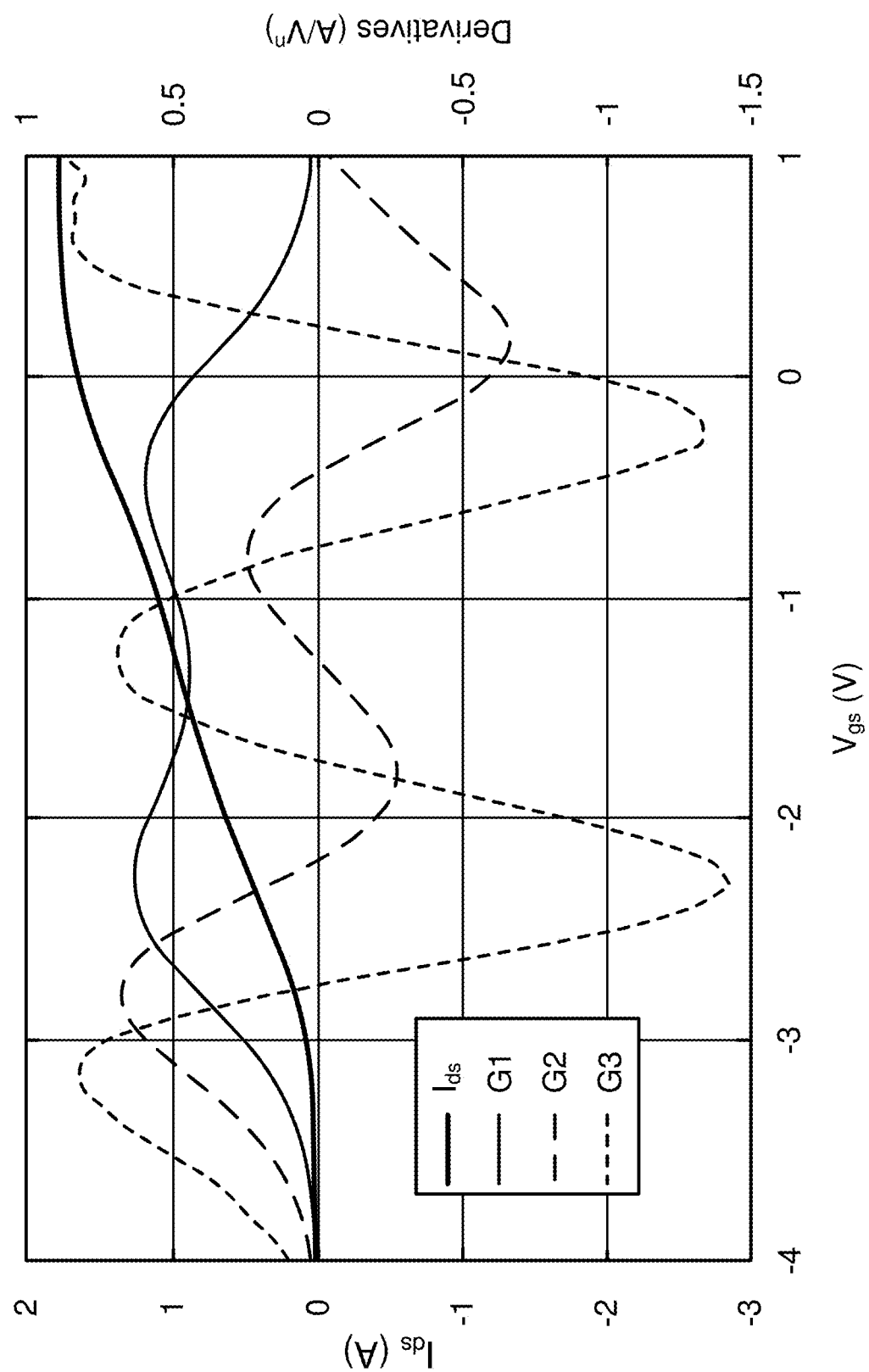
FIG. 12 is a plot illustrating a transfer function and the corresponding derivatives according to one or more embodiments of the present technology.
Figure 13A:
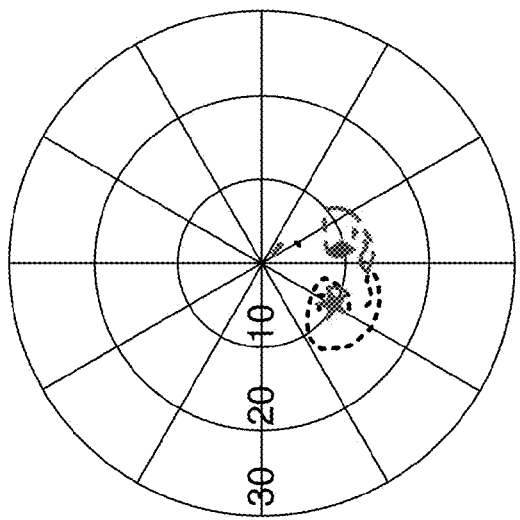
FIGS. 13A-13F are plots illustrating IMD3 suppression at various frequencies according to one or more embodiments of the present technology.
Figure 13D:
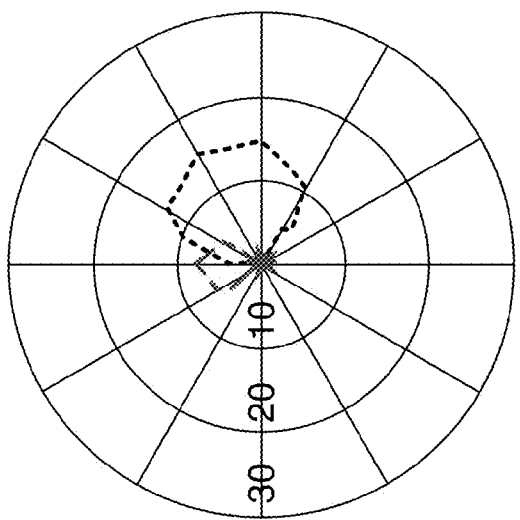
Figure 13B:
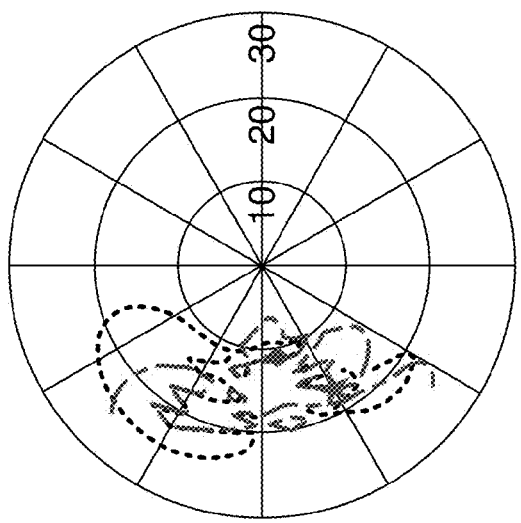
Figure 13E:
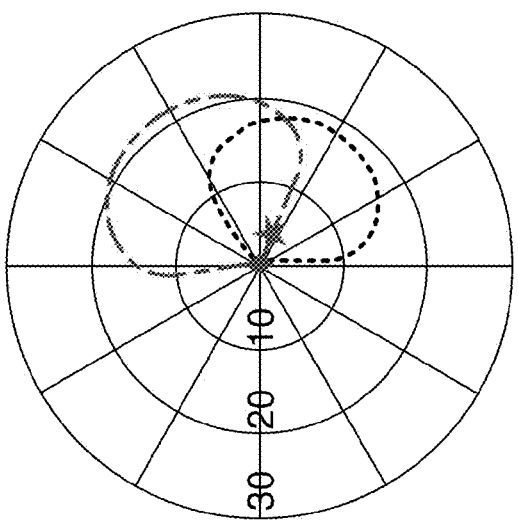
Figure 13C:
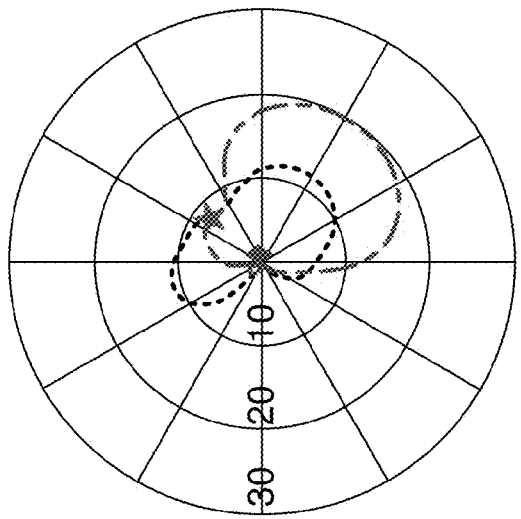
Figure 13F:
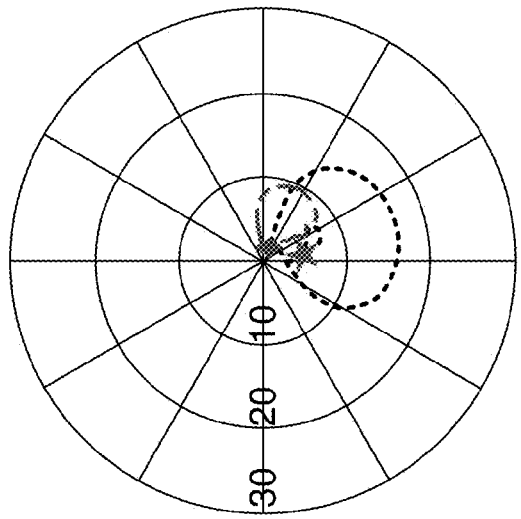

FIG. 12 provides a plot demonstrating the Ids-Vgs transfer function and the first three derivatives of the transfer function. The third order derivative, labeled here as $G_3$, is the governing force which drives the weak nonlinearity. Nonlinear conductance is a particularly dominant effect in gallium nitride devices (GaNs); for example, the derivative terms $G_{1,2,3}$ for the CGH27015F transistor used here are extracted from simulation of a large-signal model are shown in FIG. 12.

FIGS. 13A-13F demonstrate the contours of suppressed IMD3 from simulation as a function of F(s) attenuation and phase shift, represented in polar form. Contours indicate regions of the F(s) plane for which the upper (red, larger dashes) and lower (black, smaller dashes) IMD3 is suppressed relative to the shorted IF case. The diamond and star markers in FIGS. 13A-13F indicate minima in the upper and lower IMD3 tones respectively. FIGS. 13A-13F further represent conditions at different operating frequencies ranging from 1 MHz, 10 MHz, 50 MHz, 100 MHz, 150 MHz, and 200 MHz which correspond to FIGS. 13A-13F respectively.

The simulated upper and lower IMD3 tone response to the feedback path for tone spacings from 1 MHz to 200 MHz as $A_F(S)$ and $\theta_F(S)$ are varied with an IF diplexer element (dc block capacitor and dc feed inductor) present to bias the amplifier as it will be in practice. The benchmark case in which the IF is terminated with a short circuit, with no second stage IF inductor (LIF) such as in FIG. 10 is used as a reference. The contours represent values in the F(s) plane for which the IMD3 tone at P3 dB is improved (i.e., IMD3 tone power is reduced) compared to the shorted IF case. The markers indicate the values for F(s) corresponding to best possible suppression of the upper or lower IMD3 tone power.

Figure 14A:
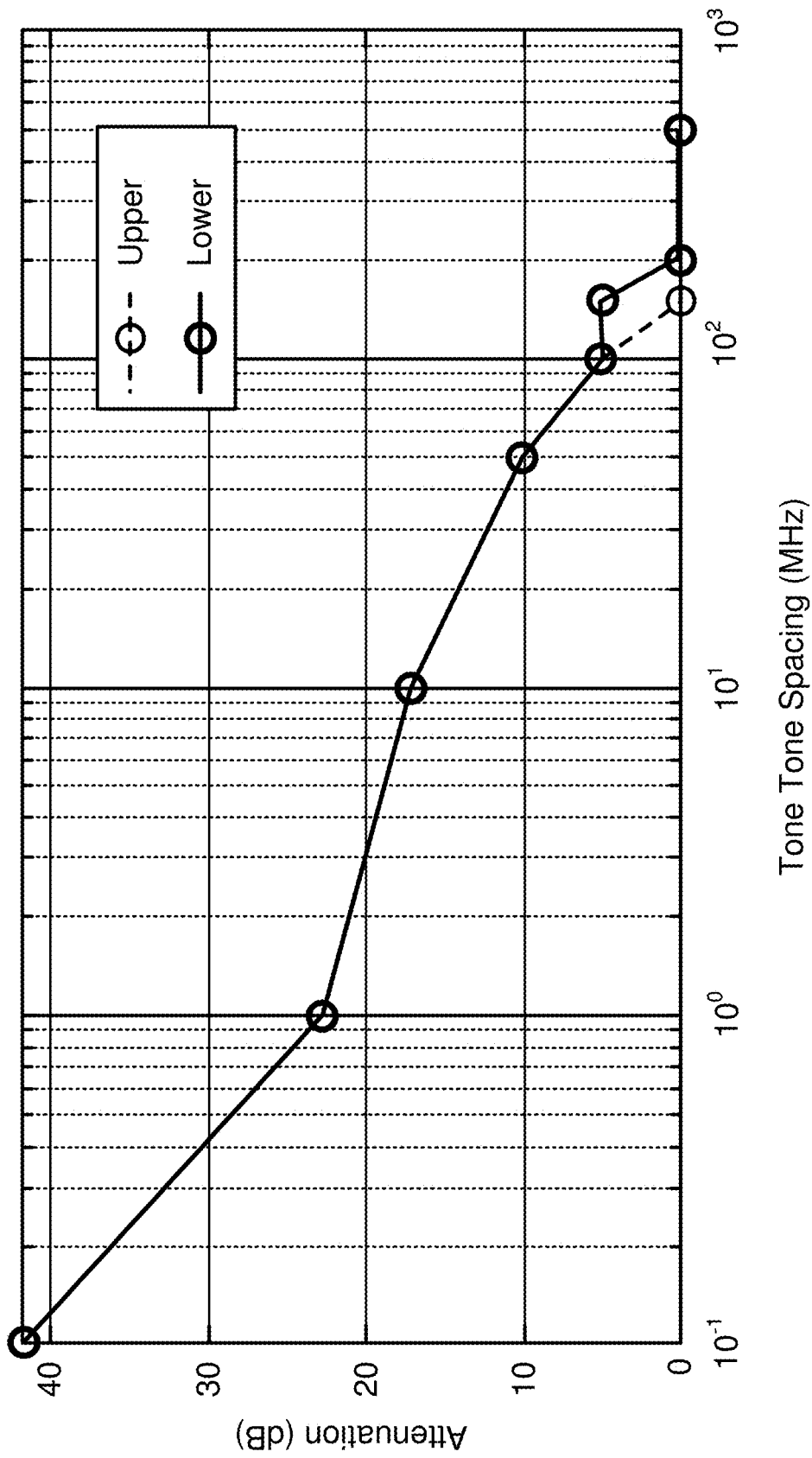
FIGS. 14A-14C are plots illustrating target feedback transfer functions for minimizing upper and lower IMD3 tones according to one or more embodiments of the present technology.
Figure 14B:
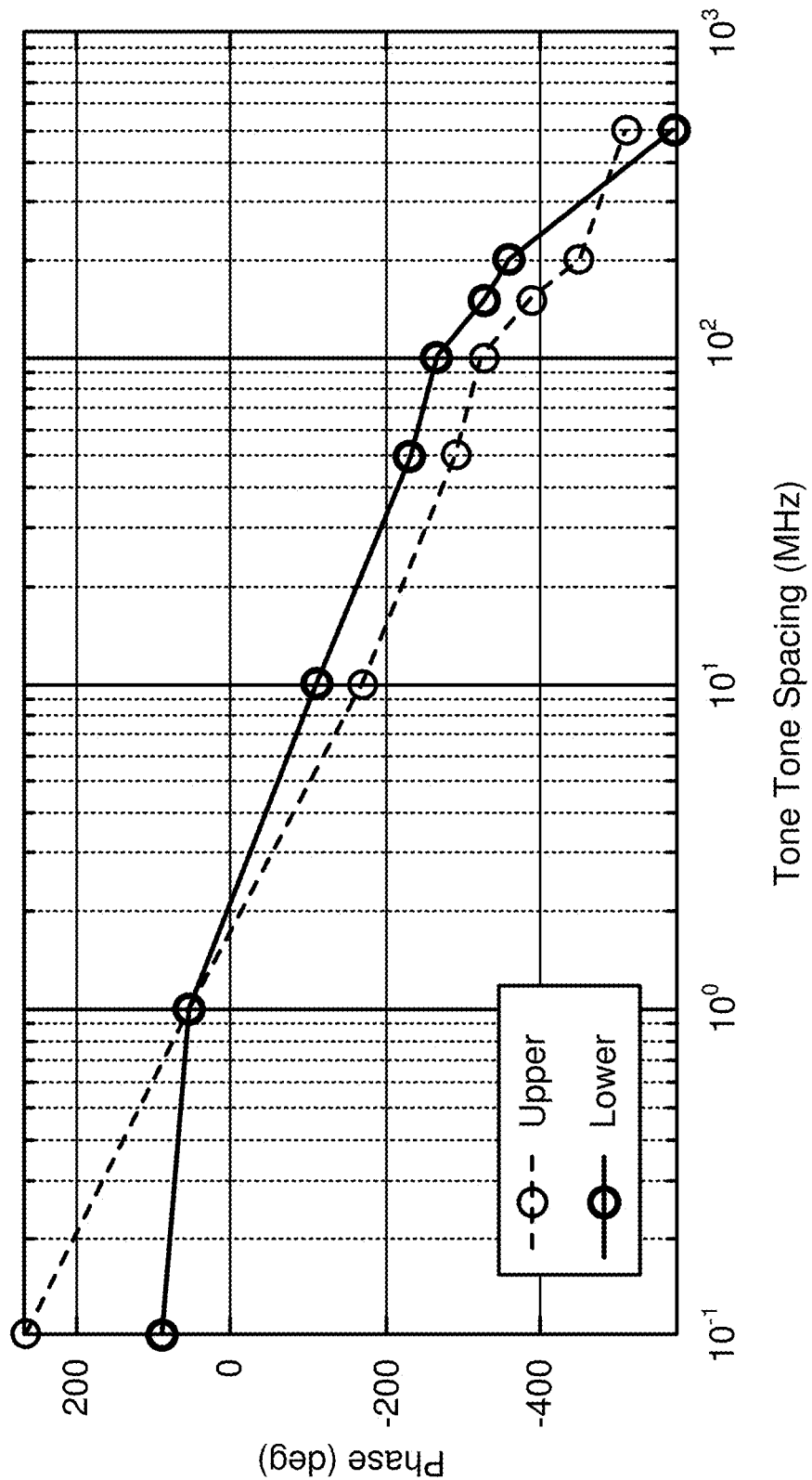
Figure 14C:
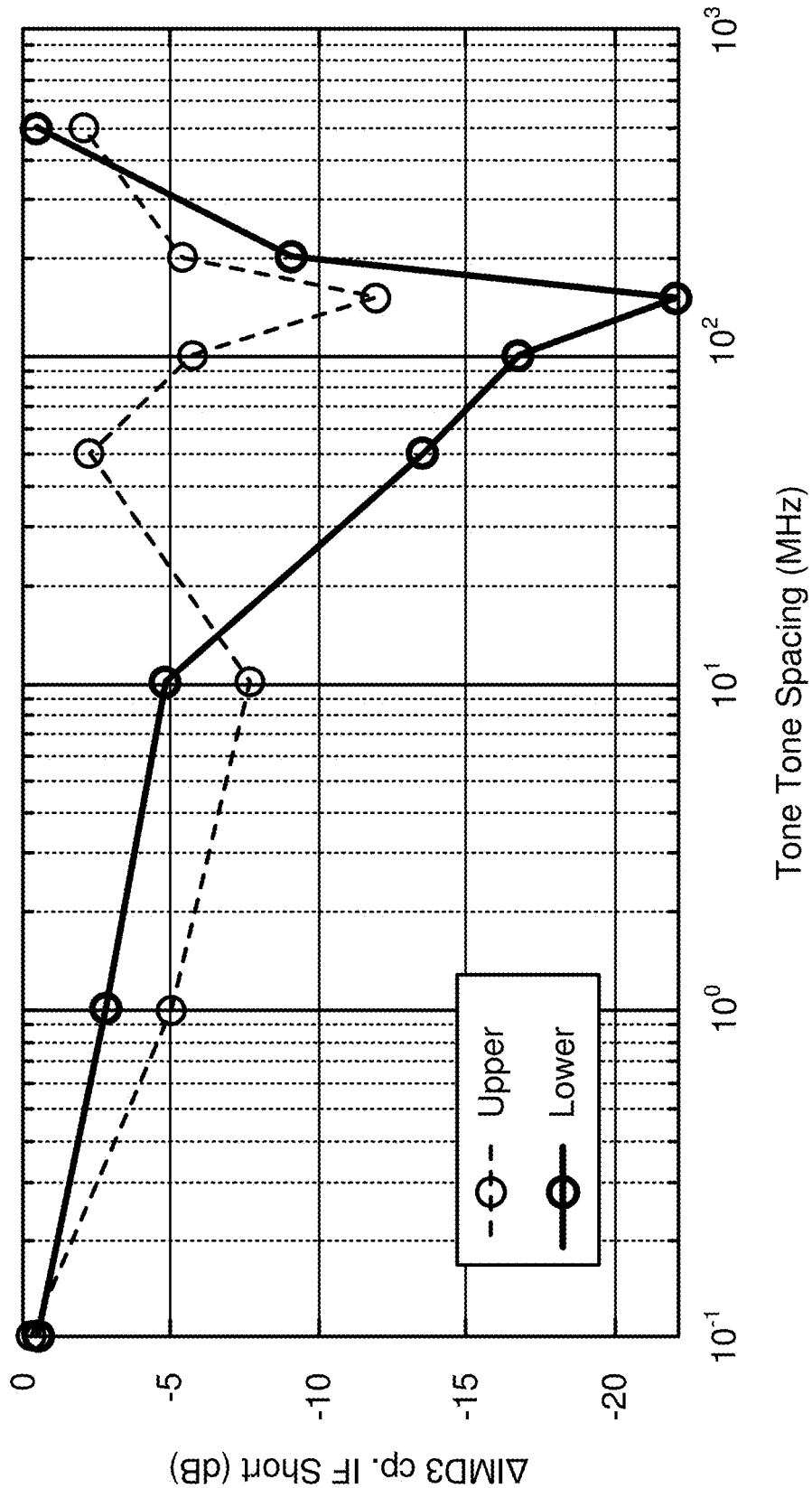

Based on the information in FIGS. 13A-13F, a transfer function F(s) is constructed as shown in FIGS. 14A-14C where the IF diplexer element used to simulate the feedback path is de-embedded. FIGS. 14A-14C plot the optimal (as predicted by large-signal simulation) amplitude and phase response across frequency to minimize either the upper or lower tone, and the resulting IMD3 suppression. Simulation results indicate that the best "compromise" transfer function targeting the best overall suppression also coincides with that of the upper tone. The results suggest that the F(s) transfer function should be implemented primarily between 1 MHz and 200 MHz where the IMD3 suppression is greatest. Conveniently the required attenuation and phase response mirrors that of a high-pass filter, indicating that this transfer function is likely to be realizable.

The ideal feedback transfer function is reported in FIGS. 14A-14C and suggest that F(s) should be implemented as a high-pass filter. The high-pass filter-like response is convenient as it can be constructed as an LC ladder network which, when implemented shunt element first, provides a biasing inductor and a dc blocking capacitor for both the gate and drain. To experimentally demonstrate the proposed technique, both transfer functions minimizing the upper IMD3 tone (which also produces best overall suppression) and minimizing the lower IMD3 tone are implemented. Suppression in the 10-100 MHz tone spacing frequency range is specifically targeted for the filter design. Beyond this frequency range, a steep increase in the required negative phase contribution from F(s) may preclude the practical implementation of the feedback path in certain circumstances. This phase response is likely due to the practical biasing structure that was assumed in simulation.

Figure 15B:
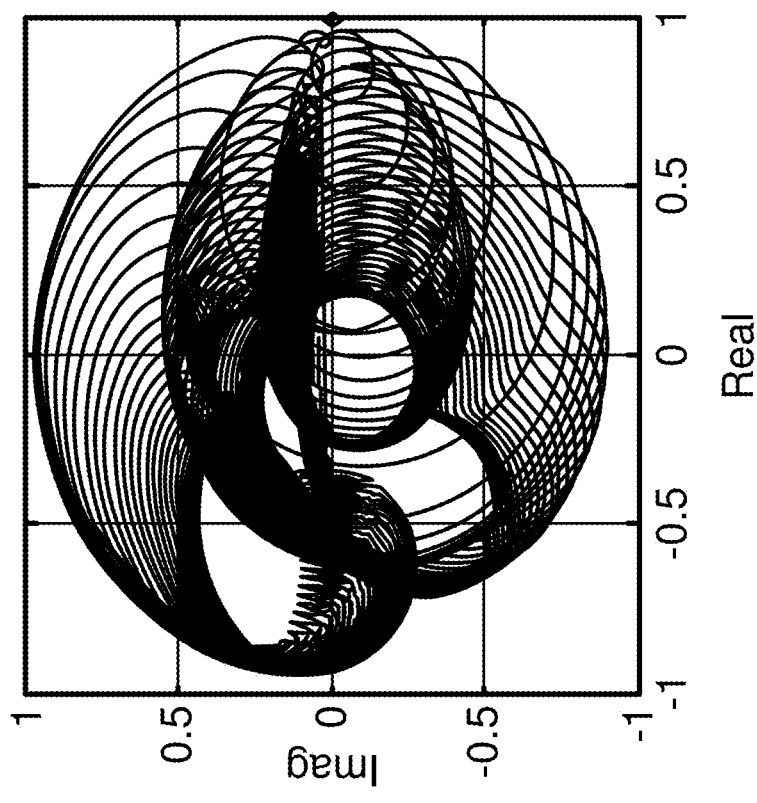
FIGS. 15A and 15B are plots illustrating the simulated loop gain envelope for minimizing upper and lower IMD3 tones in accordance with one or more embodiments of the present technology.
Figure 15A:
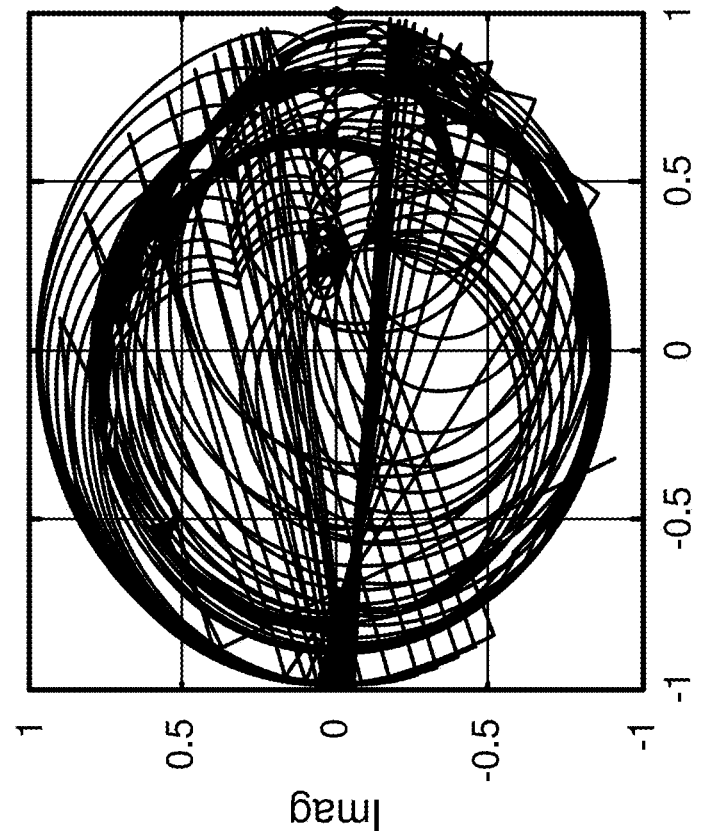

FIGS. 15A and 15B show plots of simulated loop gain envelope in feedback from 100 kHz to 3 GHz when the two transfer functions are assumed. FIG. 15A demonstrates F(s) when minimizing upper IMD3 tone, while FIG. 15B shows F(s) when minimizing lower IMD3 tone. It can be seen that in both cases the (1,0) point in the complex plane is not encircled, indicating stability. While the envelope does closely approach the critical point in both cases, it should be noted that this simulation represents a conservative estimate. In the loop gain analysis, the feedback transfer functions are assumed lossless; practical implementation will overall attenuate the response and provide a greater margin. Additionally, the closest envelopes to the (1,0) point correspond to load and source impedances that simultaneously have high voltage standing wave ratio (VSWR) compared to the expected 50Ω case. Given that the IF feedback loop can be well controlled due to its low frequency and the relatively high component value precision of available inductors and capacitors in the required range, it is expected that the implemented transfer function will not exceed the worst-case analysis shown here.

Figure 16A:
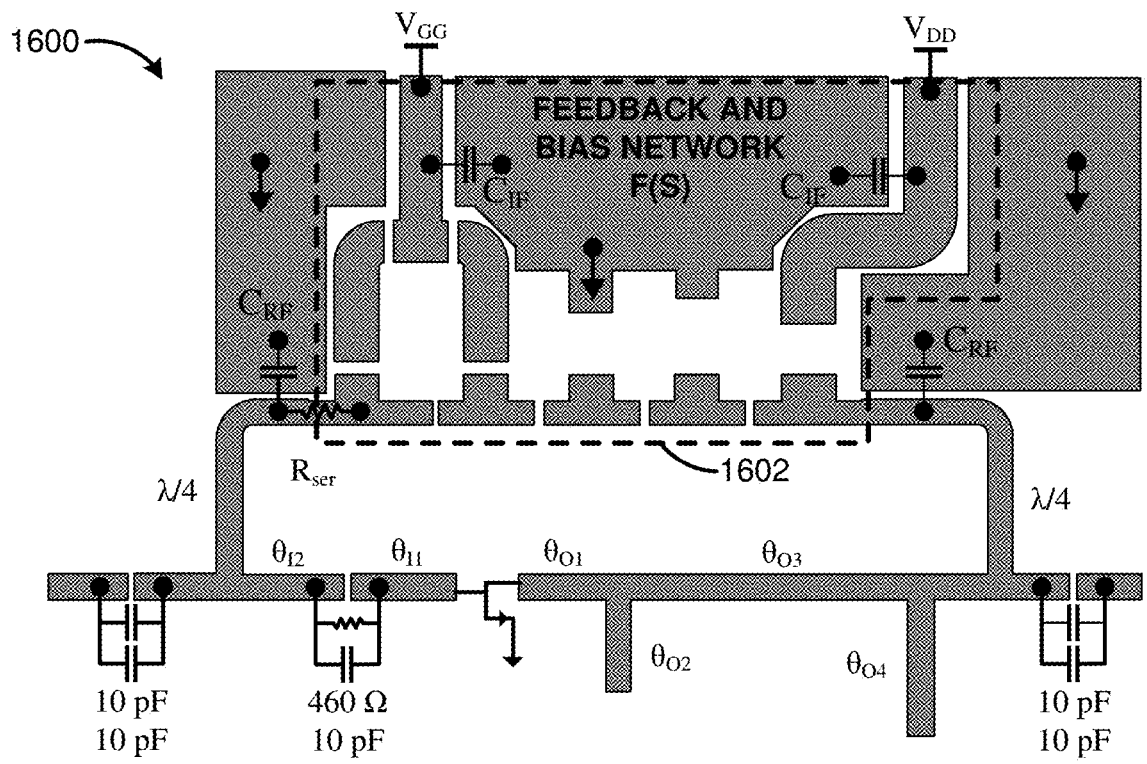
FIG. 16A is a block diagram illustrating power amplifier design according to various embodiments of the present technology.
Figure 16B:
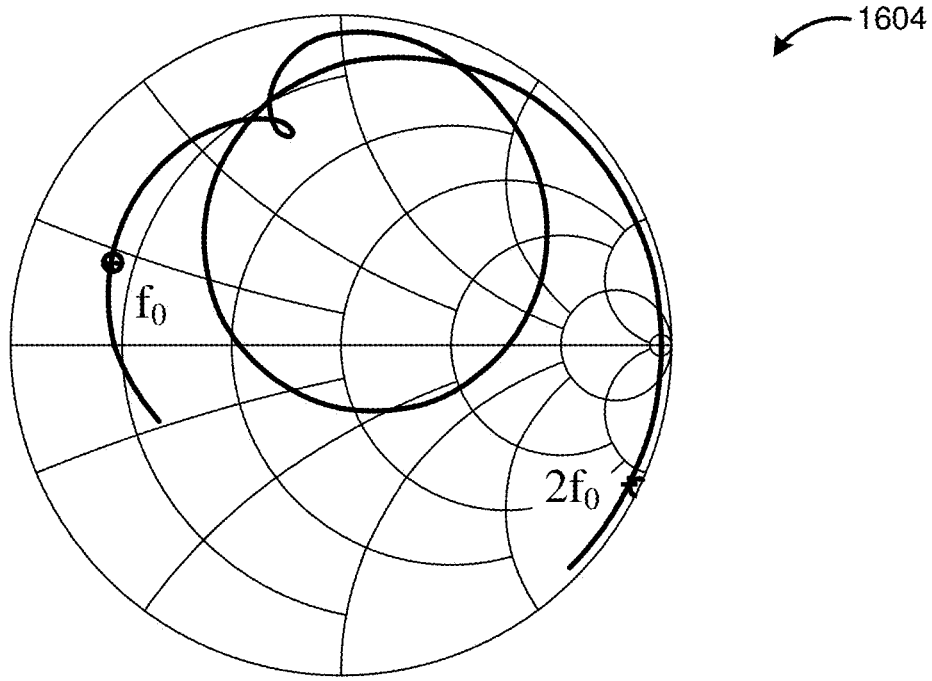
FIG. 16B is a plot illustrating the impedance trajectory present in the transistor drain according to various embodiments of the present technology.

FIG. 16A shows a layout block diagram of the designed amplifier in which both the PA 1600 design and location 1602 for the feedback transfer function F(s) can be seen. FIG. 16B is a plot 1604 that shows the output impedance targets at the fundamental ($f_0$) and second ($2f_0$) harmonics for the class-AB amplifier 1600 based on large-signal load-pull simulation, along with the impedances presented by the output matching network (OMN). The OMN can be implemented using a double-stub network to enable straightforward impedance tuning of the fundamental and second harmonic. It can be seen that at the fundamental and second harmonic frequencies the impedances are well-matched to within 10% of their target values, but it is important to note that they are only controlled over a narrow bandwidth as the double-stub matching network precludes a wide bandwidth RF match. The quarter-wave transmission line biasing structure is placed after the OMN to ensure the different feedback network realizations do not affect the RF match to the amplifier, enabling direct comparison of performance. Similarly, the design ensures that the same placement of CRF can be used for each experimental case. Avoiding perturbation of the second harmonic is especially critical as the second harmonic impedance determines the transfer function required to minimize IMD3.

Figure 17A:
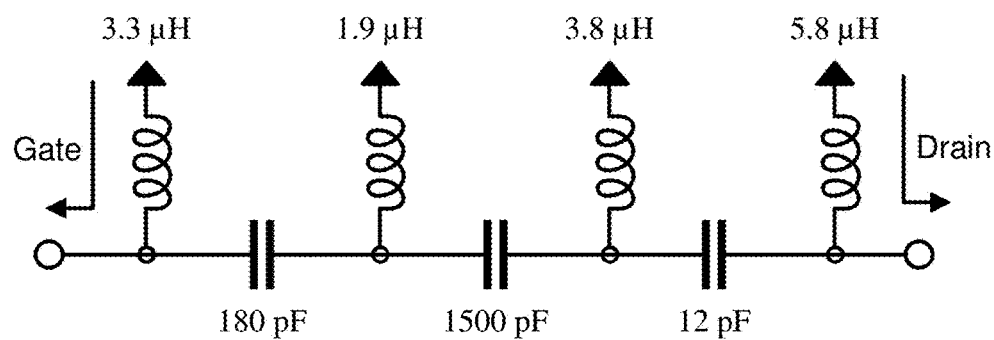
FIGS. 17A and 17B illustrate 7-pole and 9-pole filter designs according to various embodiments of the present technology.
Figure 17B:
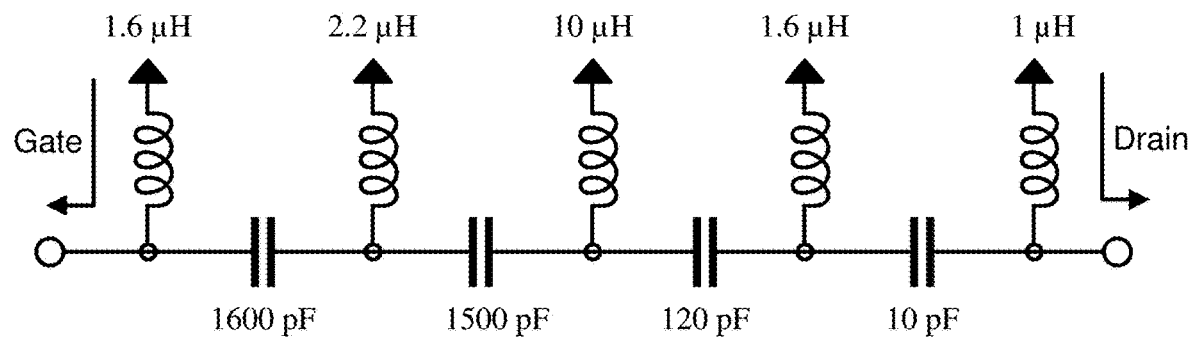
Figure 18A:
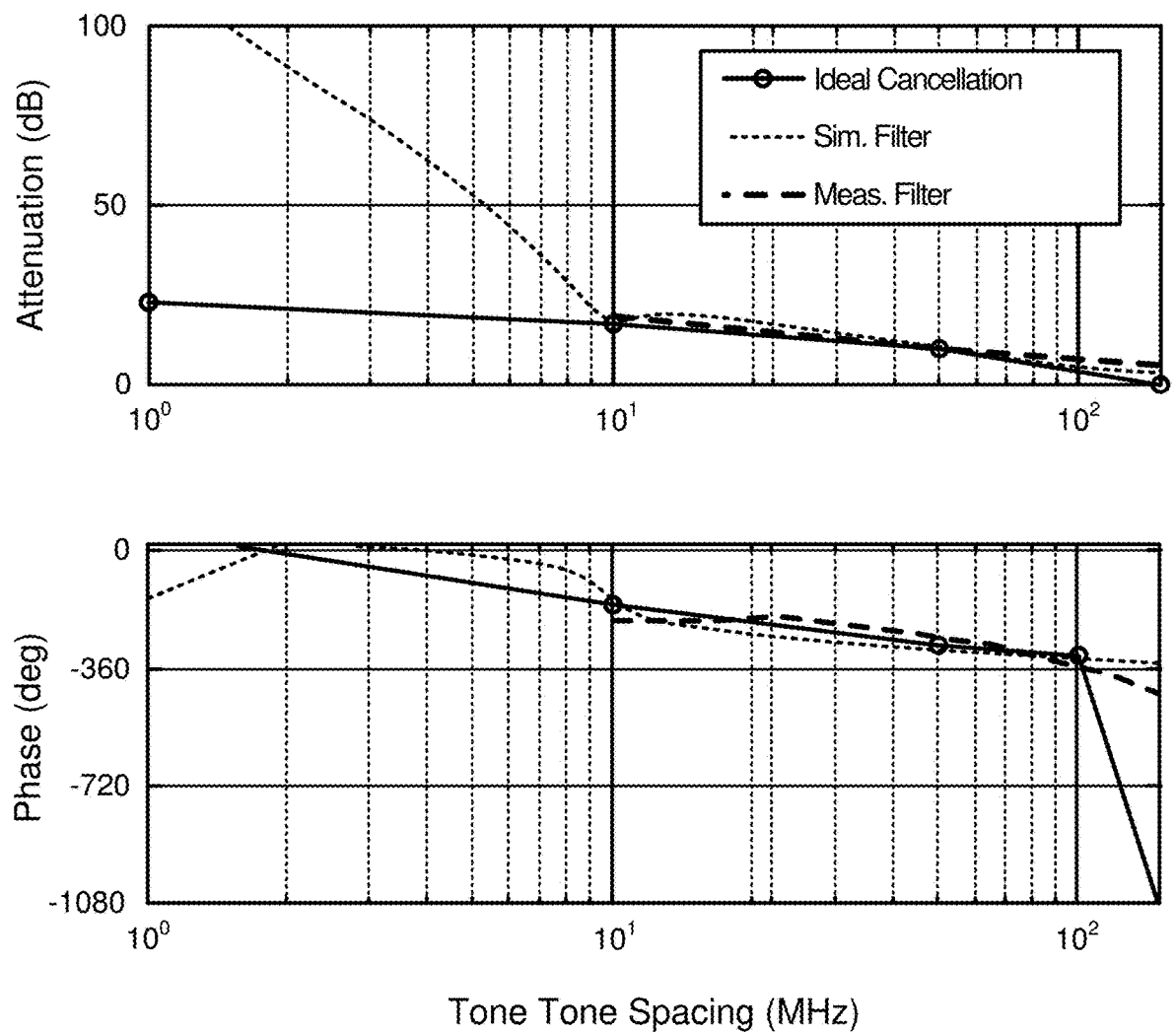
FIGS. 18A and 18B are plots illustrating the measured feedback network response for minimizing the upper tone according to various embodiments of the present technology.
Figure 18B:
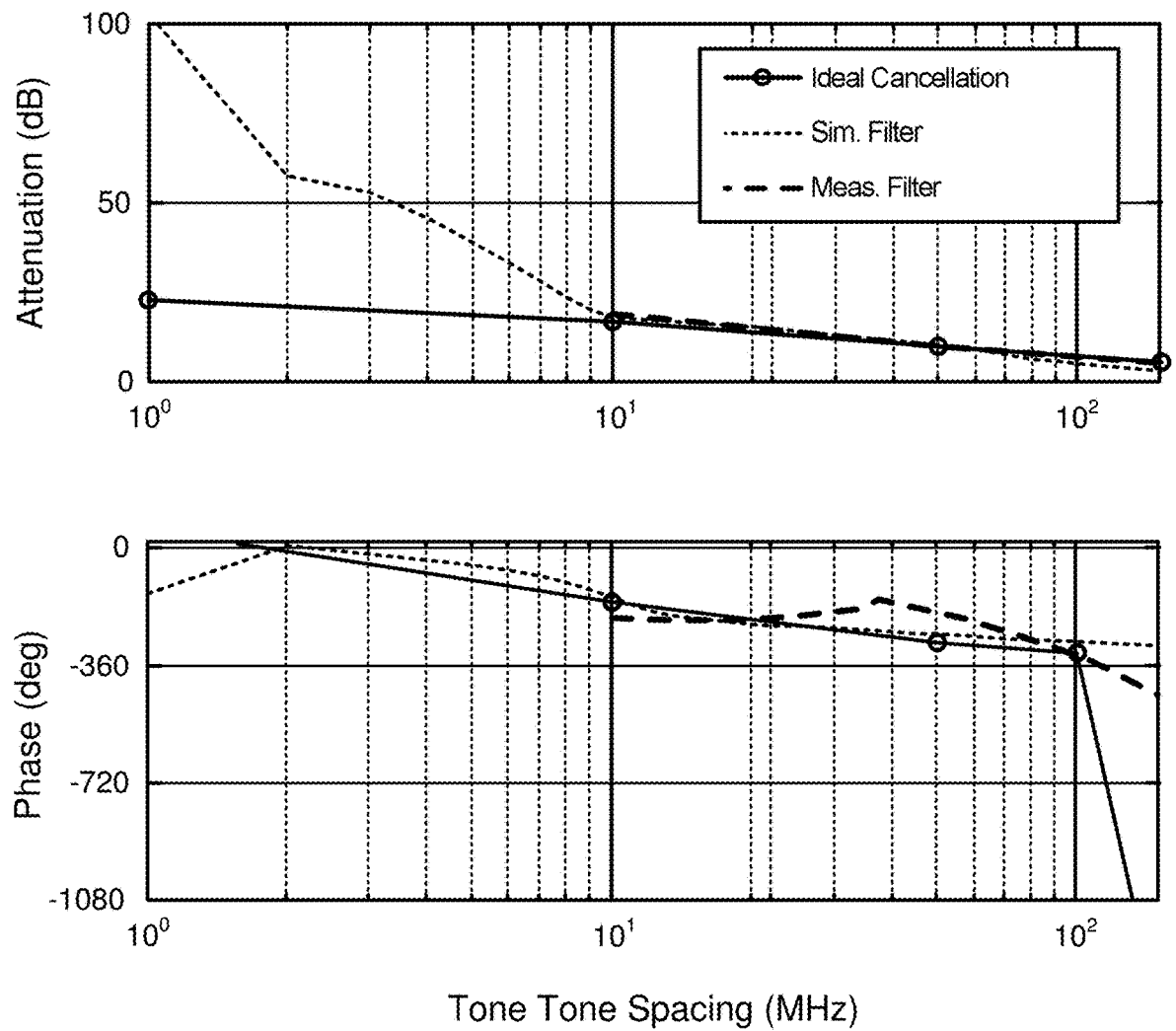

FIGS. 17A and 17B present filter designs for implementing F(s). FIG. 17A is a 7-pole filter design 1700 realizing transfer function for suppression of upper IMD3 tone. FIG. 17B shows a 9-pole filter design 1702 for implementing F(s) to suppress lower IMD3 tones. FIGS. 18A and 18B are plots showing the measured feedback network response for minimization of IMD3 tones. FIG. 18A shows the minimization of upper IMD3 tones corresponding to the 7-pole filter design 1700, while FIG. 18B shows the minimization of lower IMD3 tones corresponding to the 9-pole filter design 1702. Measured results are restricted to frequencies greater than 10 MHz due to the limitations of available measurement equipment but cover all frequencies over which the feedback is designed to operate.

Due to the shunt-first topology, the drain and gate biases of a power amplifier can be fed through the two inductors at either end of the network (here, the 5.8 µH and 3.3 µH inductors). These relatively large inductor values may induce undesirable self-modulation effects; a possible solution is to constrain the range of values allowed for these key components.

Filter component values are found by generating an equivalent driving-point function that corresponds to the desired filter response and then applying a second form of network synthesis. A 7-pole filter is found in this analysis to be the minimum number of poles needed to reach the total phase shift and minimize deviation from the ideal filter trajectory between 10 MHz and 100 MHz. The chosen values realize the measured filter response shown in FIG.

18A. In general, the transfer function is expected to elicit the best performance for tone spacings around 10 MHz, or between 50 MHz and 100 MHz.

The filter that realizes the lower IMD3 tone minimum is realized as shown in FIG. 17B with five inductors and four capacitors. This filter is designed with the same procedure used to synthesize the 7-pole network. Because of the greater phase shift required for this transfer function, which precludes the 7-pole implementation, a 9-pole filter is used. An 8-pole solution is not selected as it would eliminate the shunt-L, series-C structure forming the bias structure of the PA. As seen in FIG. 18B, the filter realizes the desired amplitude and phase response for frequencies between 10 MHz and 100 MHz.

Figure 19A:
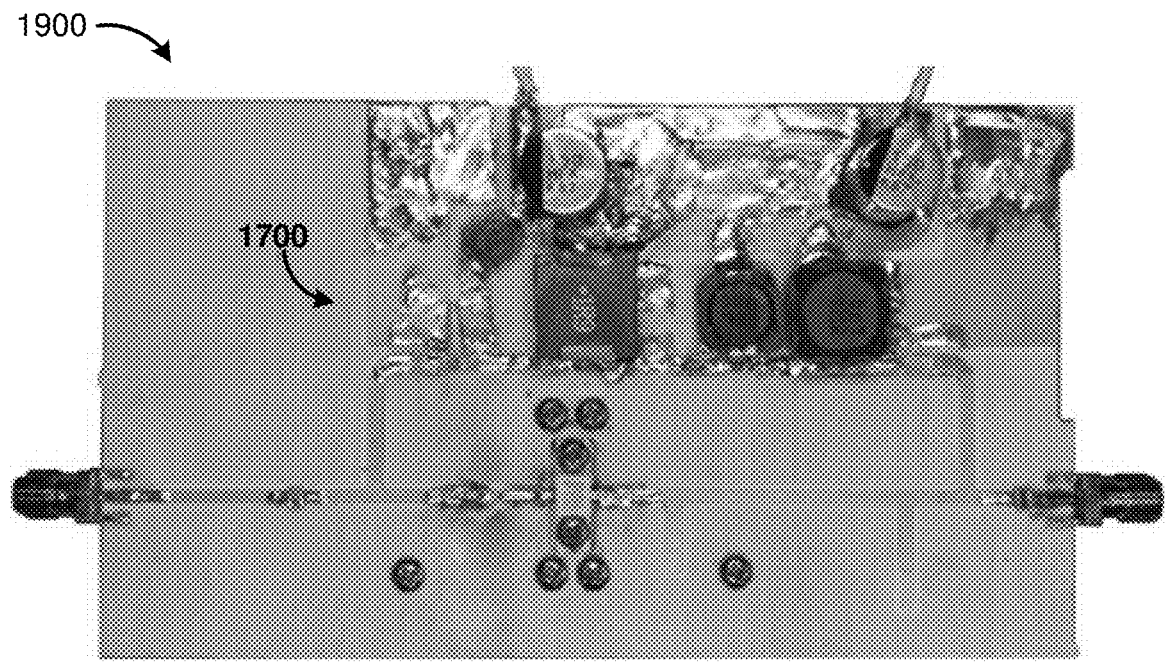
FIGS. 19A and 19B are photographs illustrating power amplifiers with 7-pole feedback and 9-pole feedback networks according to one or more embodiments of the present technology.
Figure 19B:
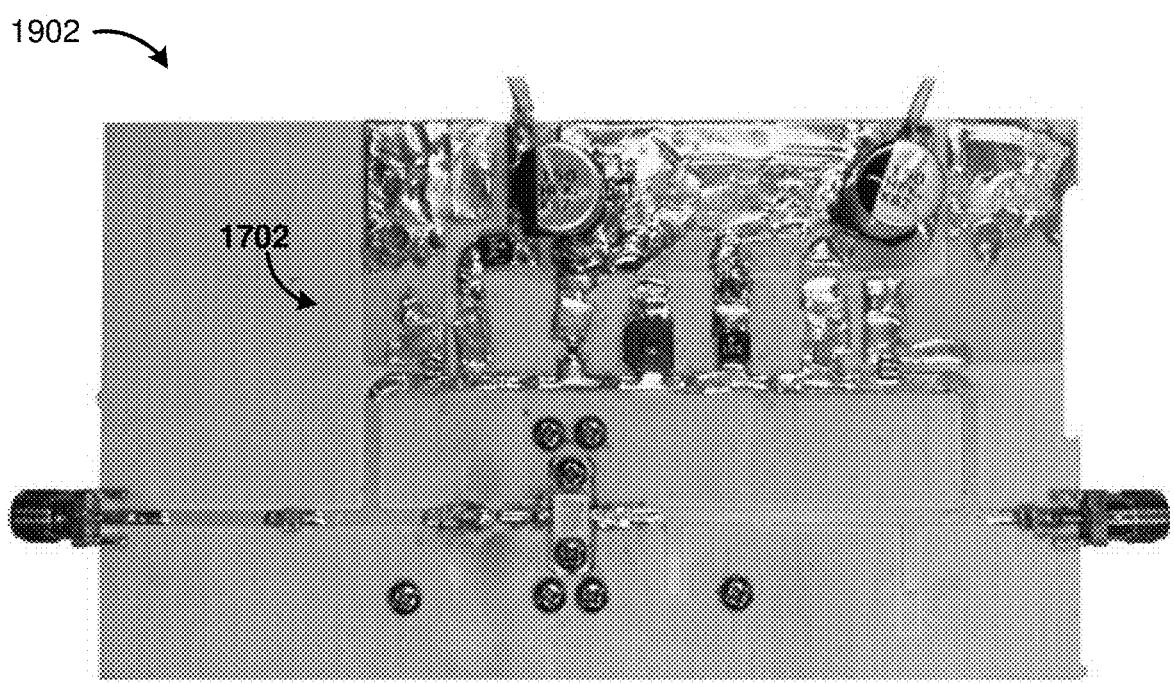

FIGS. 19A and 19B show built prototypes of 66 mm by 114 mm Pas 1900 and 1902 respectively populated with the 7-pole 1700 and 9-pole 1702 filter designs. In addition to these configurations, the PA is also characterized under the nominal IF-short case, i.e., with the filter networks removed and the IF termination capacitor $C_{IF}$ included, as FIGS. 16A and 16B. The prototype can be measured under continuous wave (CW), multitone, and complex signal excitations using the experimental setup shown in FIGS. 20A and 20B.

Figure 21:
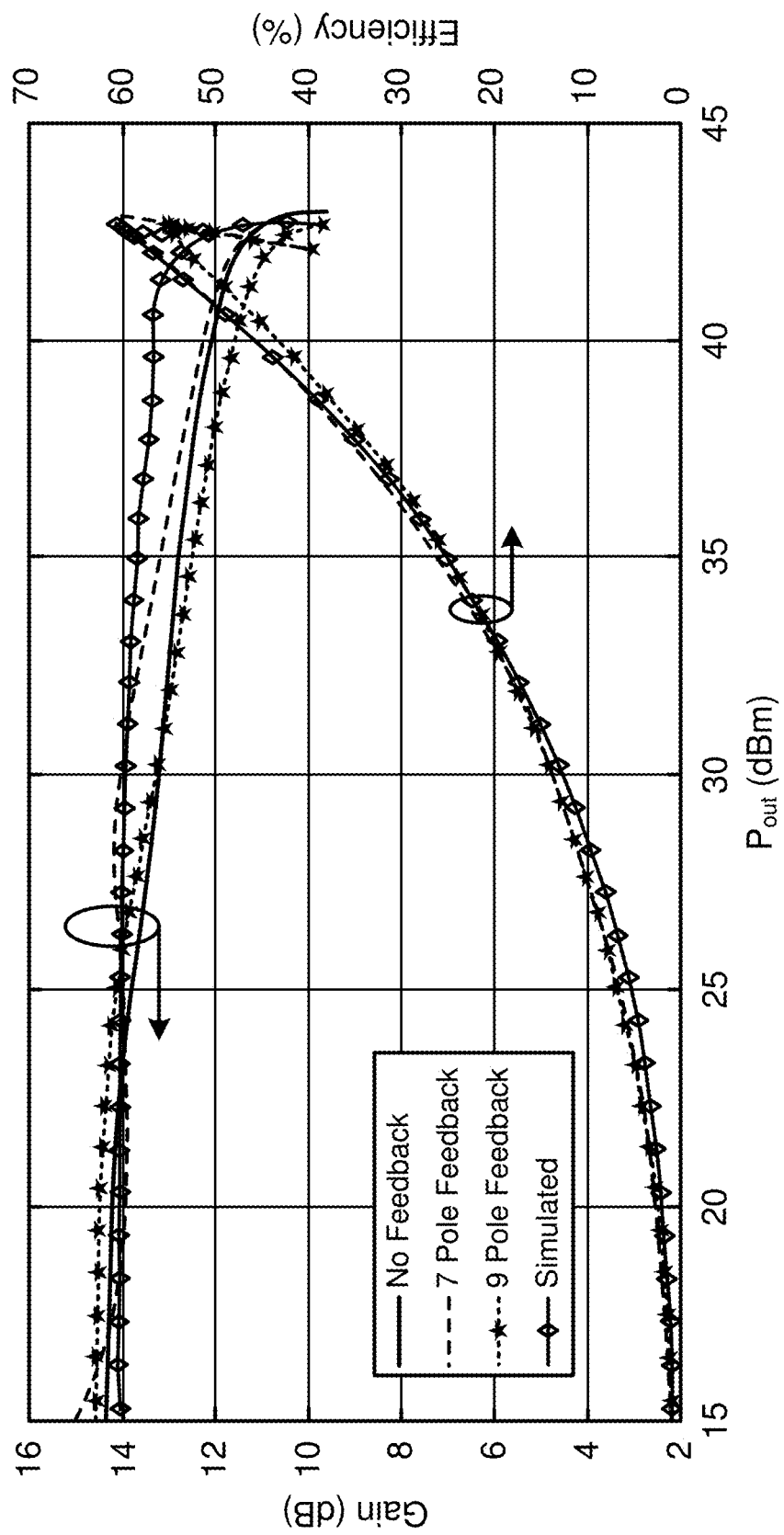
FIG. 21 is a plot illustrating a continuous wave response according to various embodiments of the present technology.
Figure 22A:
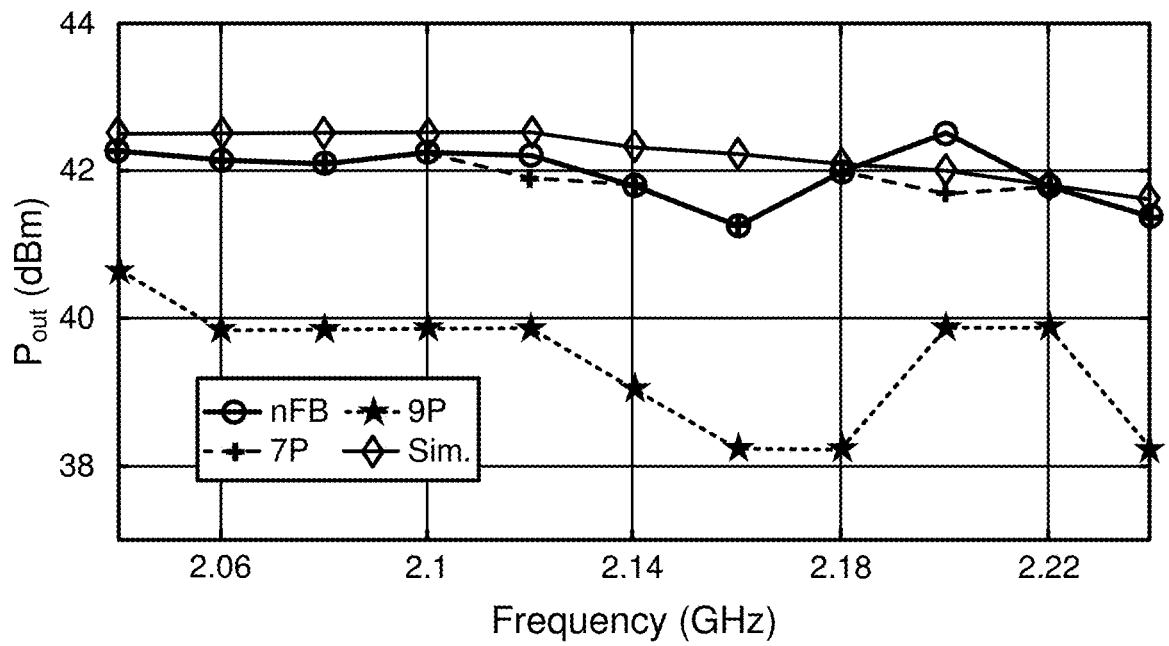
FIGS. 22A and 22B is a plot illustrating a continuous wave response according to various embodiments of the present technology.
Figure 22B:
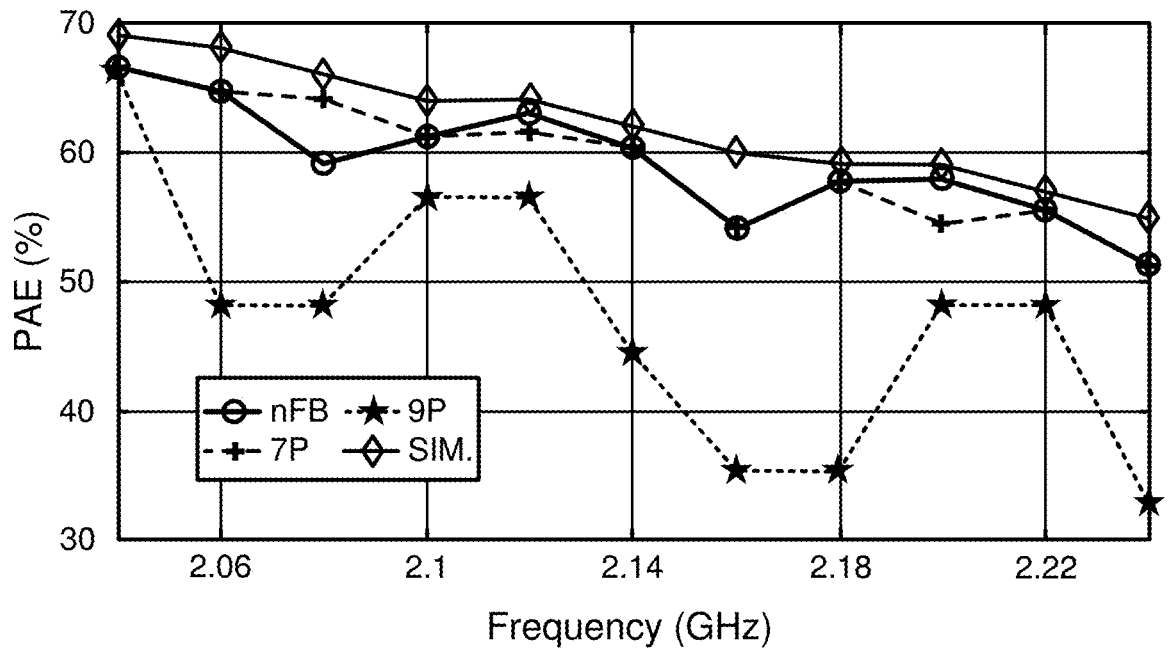

The PA is characterized under CW excitation when configured with an IF short, 7-pole feedback network, and 9-pole feedback network. FIG. 21 shows a plot reporting the gain and PAE vs. output power for a CW power sweep at the 2.14 GHz design center frequency. FIGS. 22A and 22B are plots demonstrating the response across RF frequency. The IF short performance closely matches the prediction from simulation, and the feedback networks do not significantly perturb the RF performance. The prototype under 7 pole feedback exhibits increased PAE at 2.14 GHz compared to the IF short case and slightly increased gain in back-off while achieving the same maximum output power.

Figure 20A:
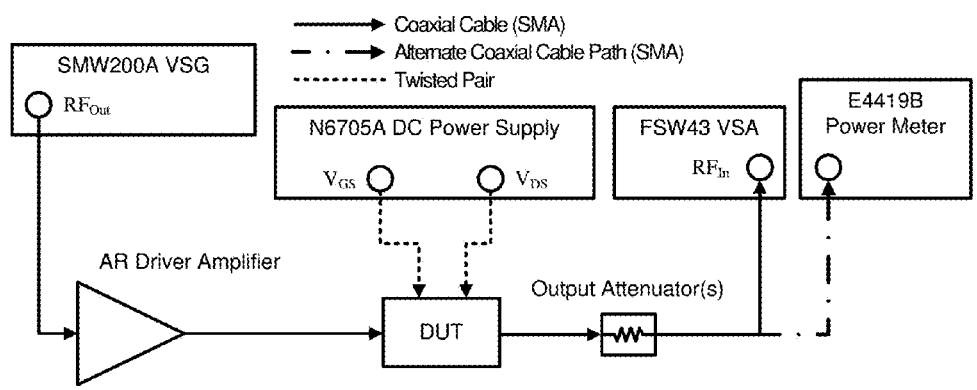
FIG. 20A is a block diagram illustrating the measurement test bench according to various embodiments of the present technology.
Figure 20B:
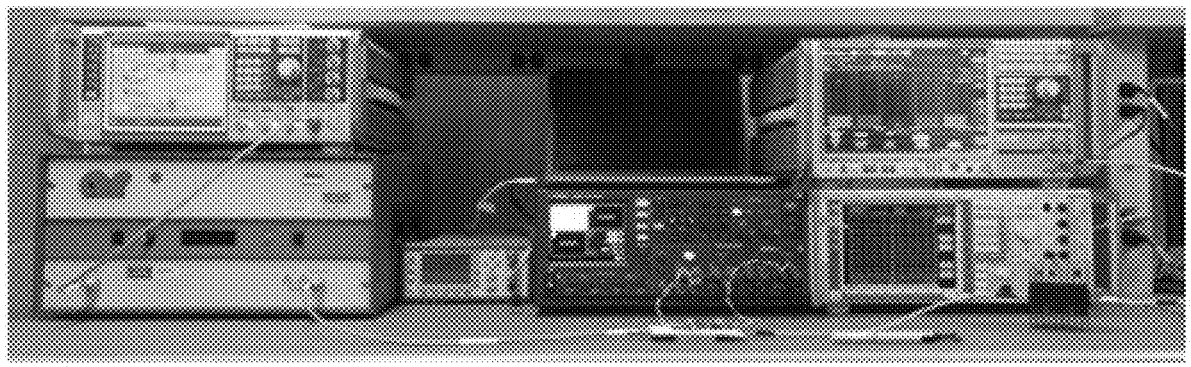
FIG. 20B is a photograph illustrating the test bench layout according to one or more embodiments of the present technology.

The experimental test setup shown in FIGS. 20A and 20B can be used to characterize the PA response under two-tone excitation. Tone spacings between 100 kHz and 200 MHz are evaluated. The measurements presented here compare the two feedback filter designs to the nominal case (e.g., shorted-IF). In these comparisons, IMD3 suppression is presented as the difference between IMD3 of the feedback case to the IF short (e.g., negative IMD3) which, in the following plots, corresponds to an improvement in IMD3 suppression.

Figure 23A:
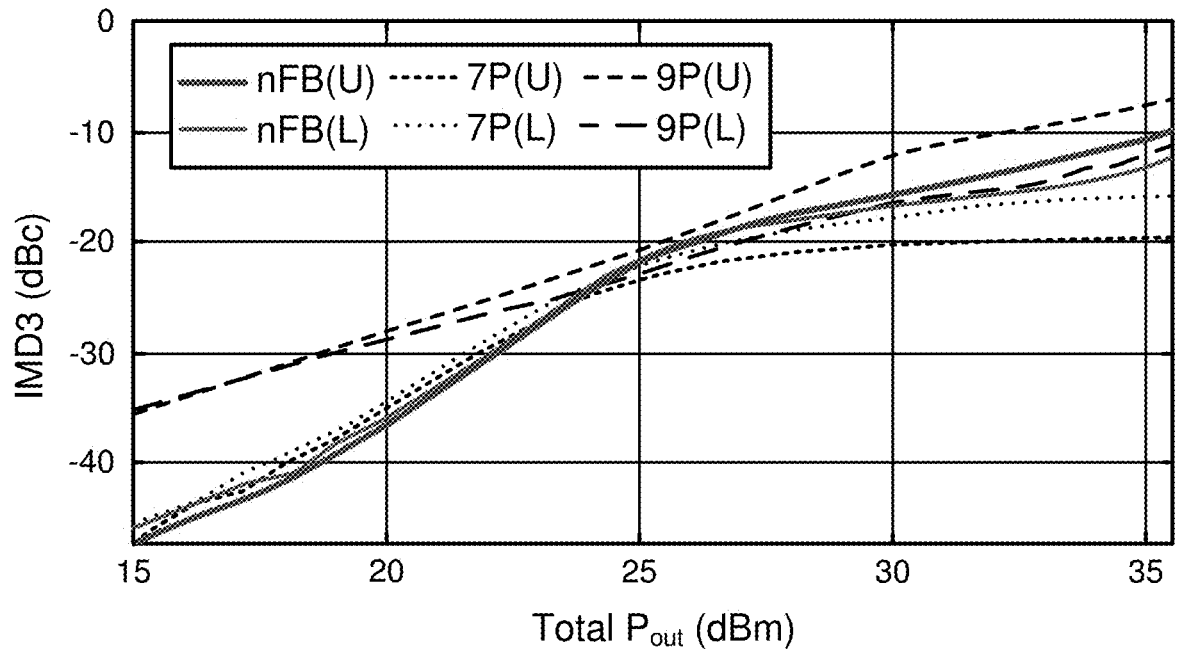
FIGS. 23A and 23B are plots illustrating measured IMD3 at 10 MHz according to various embodiments of the present technology.
Figure 23B:
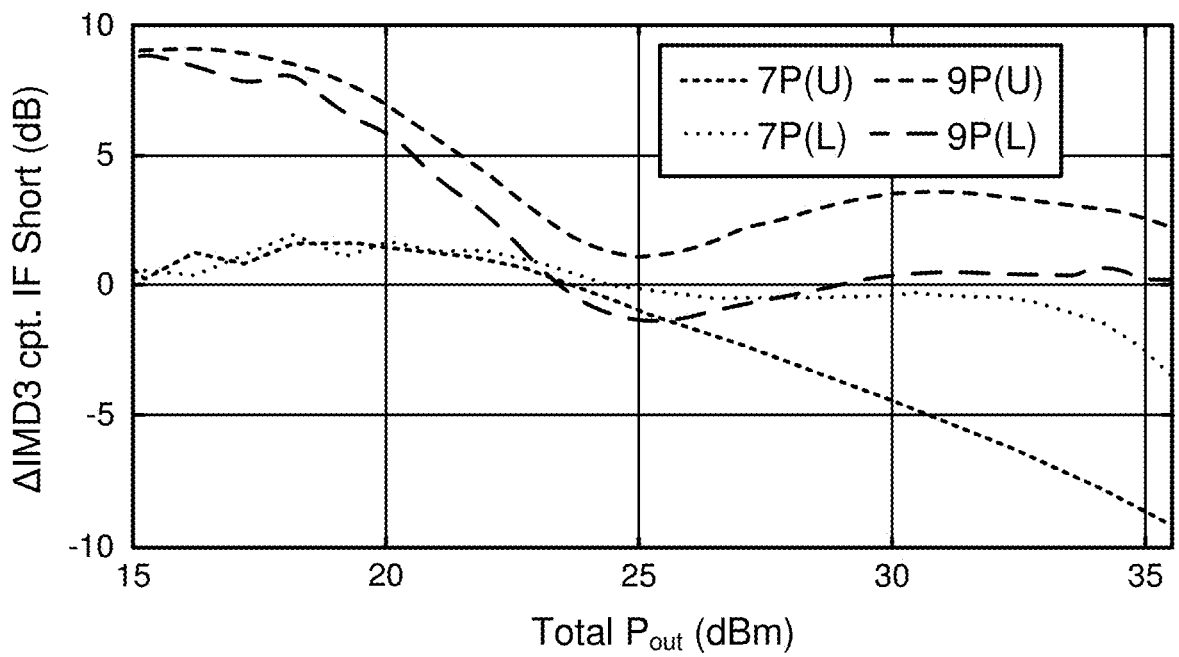
Figure 24A:
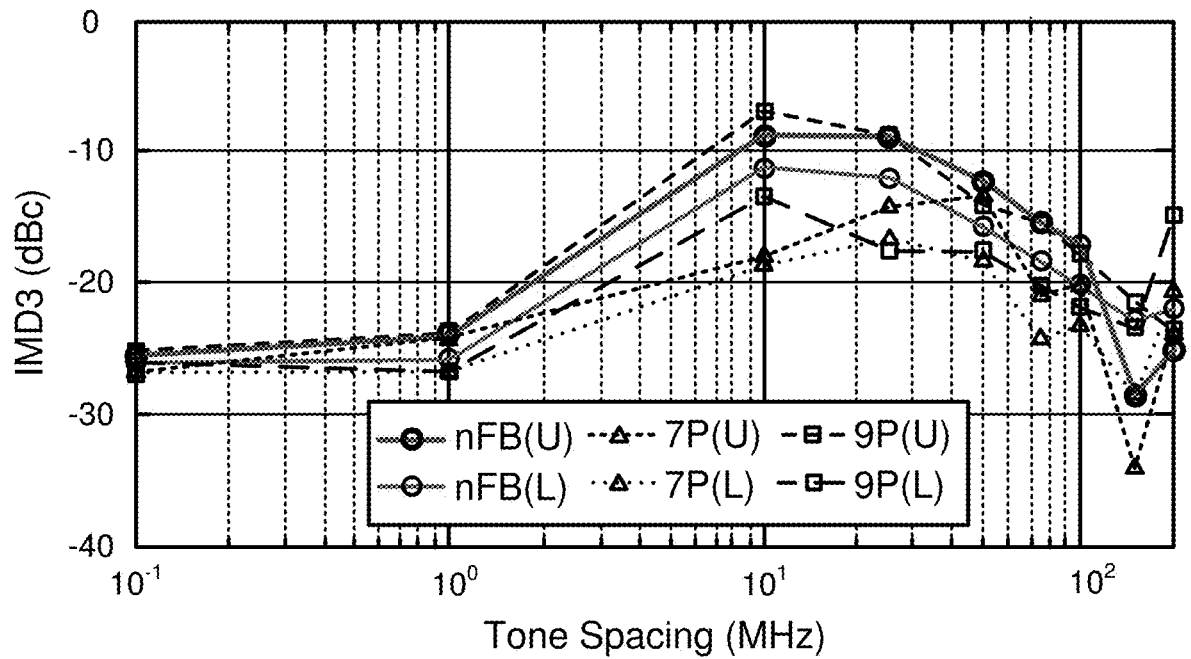
FIGS. 24A and 24B are plots illustrating measured IMD3 at P3 dB across frequency according to various embodiments of the present technology.
Figure 24B:
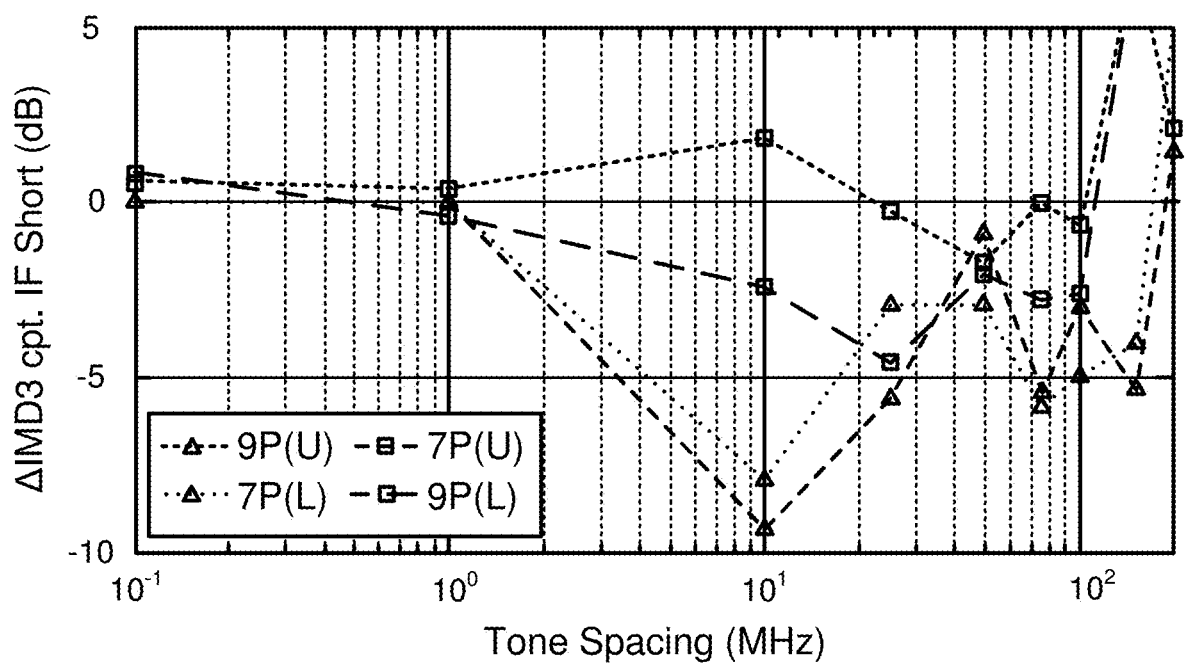

FIGS. 23A and 23B are plots that respectively report the IMD3 measured for the IF-short, 7-pole filter, and 9-pole filter cases, and the IMD3 suppression of each feedback topology relative to the shorted IF case. The 7-pole filter evidently provides a better response across power levels, with the 9-pole filter degrading IMD3 in back-off and at the P3 dB design power only suppressing the lower tone. A similar trend is seen in FIGS. 24A and 24B, where the 7-pole filter provides better suppression over the majority of the tone spacing frequency range.

Over a 1-MHz to 200-MHz range, both IMD3 tones are suppressed relative to the nominal IF short case, with maximum suppression occurring at the target design frequency of 10 MHz. When compared to the simulated IMD3 suppression in FIGS. 23A and 23B, the suppression for the 7-pole case matches the overall trend but not the predicted values. This difference between simulation and measurement is related to the imperfect realization of the required transfer functions, as shown in FIGS. 23A and 23B, by the filter, and to inaccuracies in the large-signal model in predicting the optimal IF terminations. This result indicates that experimentally determining the amplitude and phase response across frequency for F(s) might lead to further improvements in performance. Nonetheless, the technique appears promising and either maintains or improves the IMD3 performance of the amplifier compared to the traditional methods without perturbing the RF performance.

Figure 25:
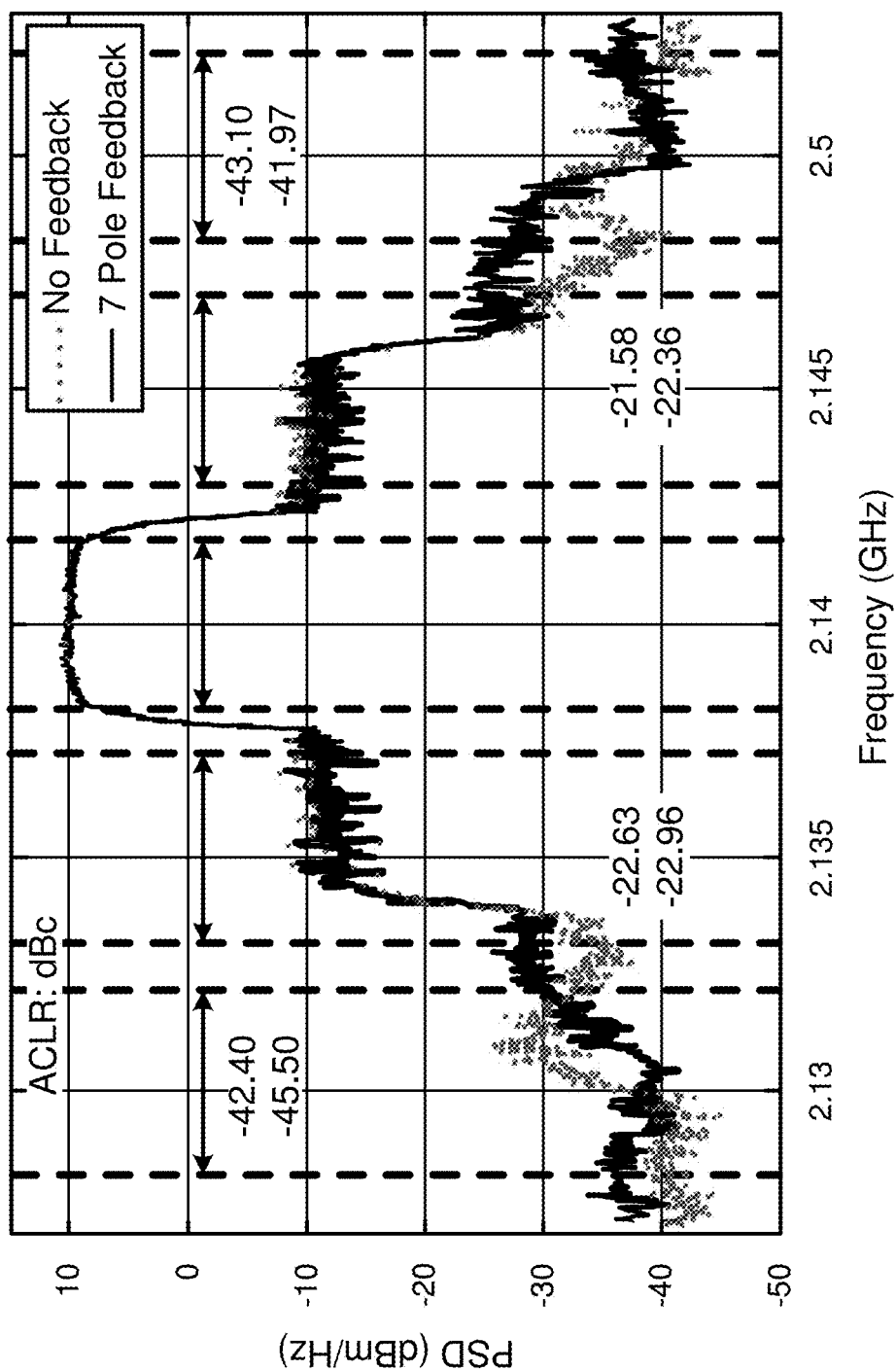
FIG. 25 is a plot illustrating W-CDMA 3GPP output spectrum with and without IF feedback with peak envelope power at P3 dB according to various embodiments of the present technology.

The output spectrum for a W-CDMA signal with 3.84-MHz bandwidth and 9-dB PAPR is shown in FIG. 25, and ACLR is reported in this figure for the no feedback and 7-pole feedback cases. In three of four adjacent channels, the 7-pole feedback structure shows slight (0.3-2.9 dB) improvement in ACLR, while performance is degraded from −43.10 dB to −41.97 dB in the second upper band. No digital pre-distortion is applied for the measurement. It should be appreciated that the relatively narrow bandwidth of the W-CDMA signal means that it operates over a frequency range where the effects of the baseband feedback are expected to be minimal, as seen in FIGS. 24A and 24B.

Figure 26A:
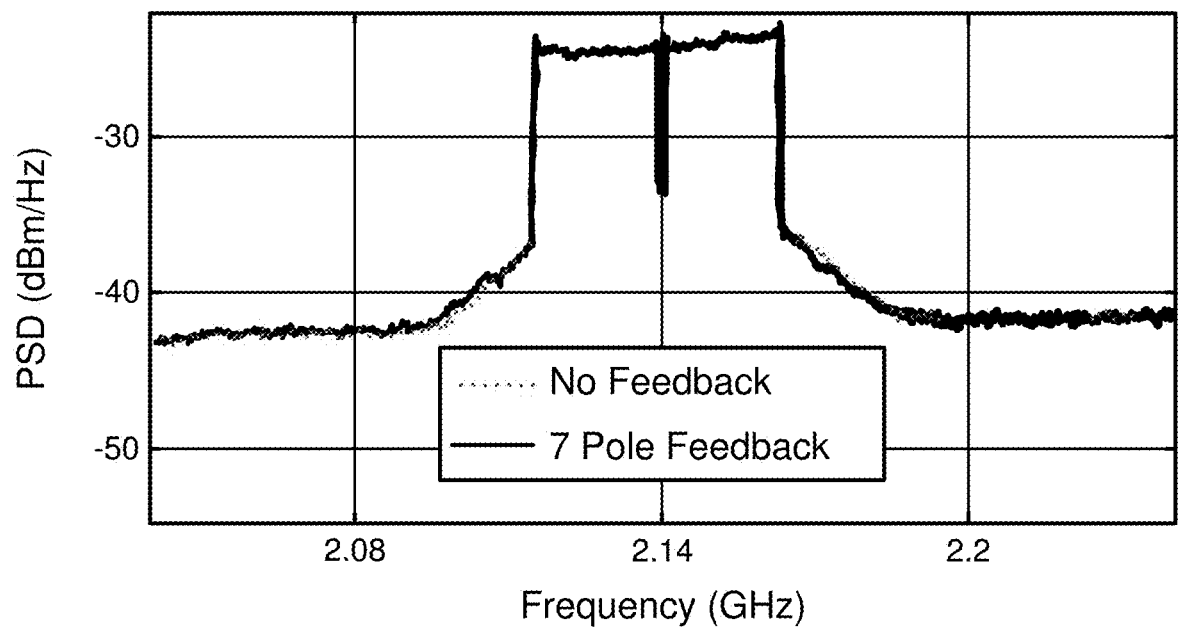
FIGS. 26A and 26B are plots illustrating NPR output spectrum without IF feedback at 50-MHz and 200-MHz bandwidth signal according to some embodiments of the present technology.
Figure 26B:
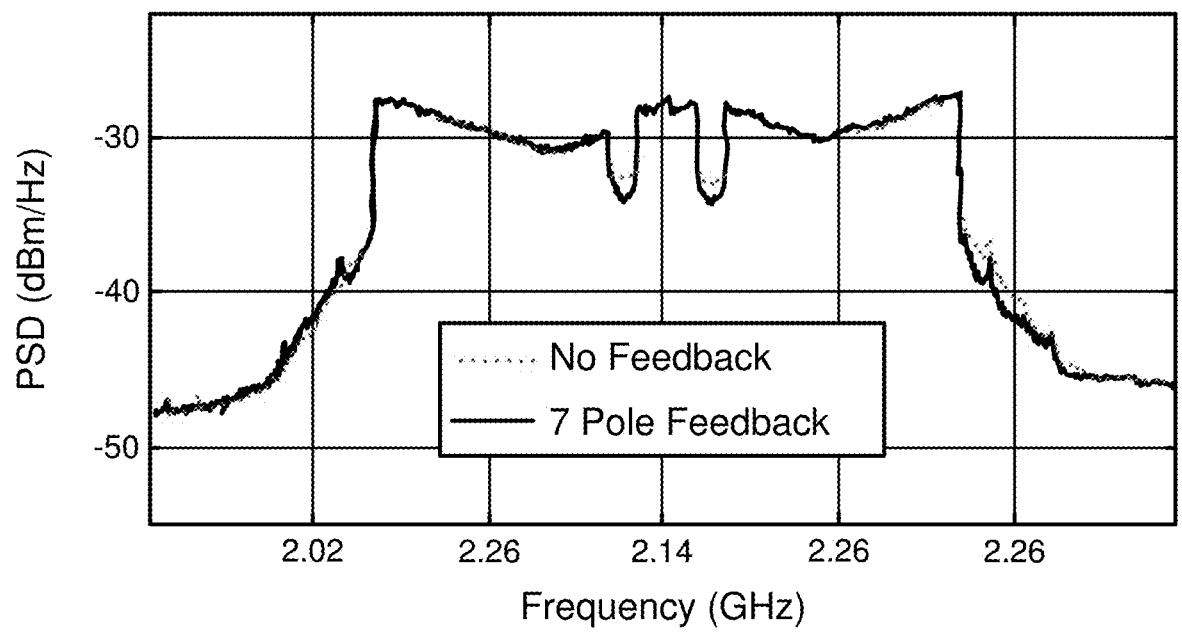

In order to examine the PA's performance over a greater bandwidth, a noise power ratio (NPR) measurement is performed for 50-MHz and 200-MHz bandwidth signals as shown in FIGS. 26A and 26B. This measurement displays the significant gain variation of this PA across the band. In the 50-MHz case, a 1-MHz notch is applied to the signal, and the 7-pole feedback case shows a 1.2-dB increase in notch depth. For the 200-MHz case, two 10-MHz notches are applied at a 10-MHz spacing from the center frequency; this signal was selected due to carrier-feedthrough limitations in the experimental setup. The feedback structure shows an improvement of 3.1 dB in notch depth. Although further detailed measurements of broad instantaneous bandwidth signals are needed, these preliminary results indicate the benefits of the proposed feedback technique.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for stabilizing an electrical device, the method comprising:
    diplexing an output signal of an active electronic device to create an out-of-band output signal at an out-of-band frequency, wherein the active electronic device operates at an in-band frequency;
    altering the out-of-band signal by applying a transfer function to the out-of-band output signal, wherein the out-of-band frequency differs from the in-band frequency; and
    diplexing the altered out-of-band output signal and an input signal of the active electronic device to combine the altered out-of-band output signal and the input signal.

2. The method of claim 1, wherein applying the transfer function to the diplexed output signal comprises utilizing active circuitry to synthesize a transfer function to further alter the output signal.

3. The method of claim 1, further comprising filtering the out-of-band output signal.

4. The method of claim 1, further comprising monitoring one or more output metrics of the active electronic device.

5. The method of claim 4, wherein monitoring the one or more output metrics of the active electronic device comprises manipulating the diplexed output signal according to the monitored one or more output metrics.

6. The method of claim 1, further comprising implementing one or more digital control or hybrid digital-analog control techniques.

7. The method of claim 1, further comprising performing stability analysis on one or more loop gain frequencies of the diplexed output signal to determine which of the one or more loop gain frequencies are unstable.

8. The method of claim 7, wherein applying the transfer function to the out-of-band diplexed output signal comprises applying the transfer function to one or more loop gain frequencies of the diplexed output signal determined by the stability analysis to be unstable.

9. A system for stabilizing an electrical device, the system comprising:
    an active electronic device configured to operate at an in-band frequency, wherein the active electronic device includes:
        an output path for transmitting an output signal; and
        an input path for receiving an input signal; and
    a feedback path positioned between the output path and the input path of the active electronic device, wherein the feedback path is configured to alter the output signal of the active electronic device at an out-of-band frequency that differs from the in-band frequency, and wherein the feedback path includes:
        at least one component device configured to alter out-of-band frequency components of the output signal by applying a transfer function to the out-of-band frequency components, and feedback a resulting signal to the active electronic device via the input path.

10. The system of claim 9, wherein the at least one component device of the feedback path comprises active circuitry for synthesizing the transfer function.

11. The system of claim 9, wherein the at least one component device of the feedback path comprises a signal filter.

12. The system of claim 11, wherein the signal filter includes a third-order resonant low-pass filter that does not pass signals having frequencies falling within a predetermined frequency range.

13. The system of claim 9, wherein the at least one component device of the feedback path comprises a non-linear circuit.

14. The system of claim 13, wherein the non-linear circuit is configured to produce a power-dependent response.

15. The system of claim 9, further comprising at least one of: a digital controller, and a hybrid digital-analog controller, coupled to the at least one component device of the feedback path, and configured to implement the transfer function to the out-of-band frequency components of the output signal.

16. The system of claim 9, wherein the active electronic device includes a power amplifier including the output and input paths of the active electronic device.

17. The system of claim 9, wherein the feedback path is further positioned between the output and input paths in the absence of lossy elements positioned in the output path.

18. A circuit for stabilizing an active electronic device that operates at an in-band frequency, the circuit comprising:
- a first means for diplexing an output signal of the active electronic device configured for coupling to an output path of the active electronic device;
- a controlling means for altering the diplexed output signal coupled to the first means for diplexing and configured to:
  - implement a transfer function on the diplexed output signal; and
  - operate at an out-of-band frequency that differs from the in-band frequency; and
- a second means for diplexing the altered diplexed output signal coupled to the controlling means and configured for coupling to an input path of the active electronic device.

19. The circuit of claim 18, wherein the controlling means comprises a signal filter to facilitate implementing the transfer function.

20. The circuit of claim 19, wherein the signal filter is a 7-pole filter.

21. The circuit of claim 19, wherein the signal filter is a 9-pole filter.

* * * * *